United States Patent
Honda et al.

(10) Patent No.: US 6,661,176 B2
(45) Date of Patent: Dec. 9, 2003

(54) HIGH PRESSURE DISCHARGE LAMP, HIGH PRESSURE DISCHARGE LAMP LIGHTING APPARATUS AND LUMINAIRE THEREFOR

(75) Inventors: Hisashi Honda, Kanagawa-ken (JP); Sadao Sakuguchi, Kanagawa-ken (JP); Masazumi Ishida, Kanagawa-ken (JP); Seiji Ashida, Kanagawa-ken (JP); Shigemi Oku, Kanagawa-ken (JP); Takahito Kashiwagi, Kanagawa-ken (JP)

(73) Assignee: Toshiba Lighting & Technology Corporation, Tokyo (JP)

(*) Notice: Subject to any disclaimer, the term of this patent is extended or adjusted under 35 U.S.C. 154(b) by 1 day.

(21) Appl. No.: 10/014,127

(22) Filed: Dec. 12, 2001

(65) Prior Publication Data

US 2002/0135304 A1 Sep. 26, 2002

(30) Foreign Application Priority Data

Dec. 12, 2000 (JP) .................................. 2000-376947
Sep. 19, 2001 (JP) .................................. 2001-284810

(51) Int. Cl.$^7$ .......................... H01J 13/146; H01J 17/18
(52) U.S. Cl. ............................ 315/56; 315/82; 315/57; 315/363; 313/625; 313/624; 313/623; 313/626
(58) Field of Search ............................ 315/56, 82, 57, 315/77, 248, 363; 313/625, 624, 623, 626, 620, 621, 637–642

(56) References Cited

U.S. PATENT DOCUMENTS

| | | | | |
|---|---|---|---|---|
| 5,416,383 A | * | 5/1995 | Genz ........................ | 313/634 |
| 5,783,907 A | | 7/1998 | Suzuki et al. ............... | 313/625 |
| 5,859,492 A | * | 1/1999 | Austad et al. .............. | 313/243 |
| 5,986,402 A | * | 11/1999 | Narita et al. ............... | 313/620 |
| 6,208,070 B1 | * | 3/2001 | Sugimoto et al. ........... | 313/493 |

FOREIGN PATENT DOCUMENTS

| | | |
|---|---|---|
| JP | 8-250068 | 9/1996 |
| JP | 10-284004 | 10/1998 |

\* cited by examiner

Primary Examiner—Don Wong
Assistant Examiner—Tuyet T. Vo
(74) Attorney, Agent, or Firm—Pillsbury Winthrop LLP

(57) ABSTRACT

A high pressure discharge lamp includes a light-transmissive ceramic discharge vessel with an envelope having a maximum outer diameter D1 and open ends, a metal pipe having one end, i.e., a top end fused in the open end of the light-transmissive ceramic discharge vessel and the other end, i.e., a base end protruding from the light-transmissive ceramic discharge vessel, a pair of electrodes each having one end, i.e., a base end connectively supported on the base end of the metal pipe and the other end, i.e., a top end extending within the light-transmissive ceramic discharge vessel, and a discharge agent which is filled in the light-transmissive ceramic discharge vessel, wherein it is also characterized by that the high pressure discharge lamp has an overall length L1, and the overall length L1 and the maximum outer diameter of D1 satisfies a following equation.

$$1.5 \leq L1/D1 \leq 4.5$$

14 Claims, 12 Drawing Sheets

HIGH PRESSURE DISCHARGE LAMP, HIGH PRESSURE DISCHARGE LAMP LIGHTING APPARATUS AND LUMINAIRE THEREFOR

CROSS-REFERENCE TO RELATED APPLICATIONS

This application is based upon and claims the benefit of priority from the prior Japanese Patent Application No. 2000-376947, filed on Dec. 12, 2000, the entire contents of which are incorporated herein by reference.

FIELD OF THE INVENTION

The present invention relates to a high pressure discharge lamp which is provided with a light-transmissive ceramic discharge vessel, a high pressure discharge lamp lighting circuit, and a luminaire therefor.

BACKGROUND OF THE INVENTION

A compact metal halide type high pressure discharge using a light-transmissive ceramics with a rated lamp power of about 20 W is described in co-pending Japanese Patent Application No. 2000-6994, which has been devised by the inventors of the present invention and filed Jan. 14, 2000 (hereinafter referred to as 6994 Prior Application).

The 6994 Prior Application refers to a high pressure discharge lamp having a light-transmissive ceramic discharge vessel which is provided with an enclosure defining a main discharge space and a pair of thin cylindrical portions integrated with both ends of the enclosure. A feed-conductor and an electrode which is mounted on the end of the feed-conductor are inserted in the slender thin cylindrical portions of the light-transmissive ceramic discharge vessel, and the thin cylindrical portion and the feed-conductor are sealed by using a ceramic sealing compound, which is the so-called a frit glass. A discharge agent comprised of a luminous metal halide, mercury, and rare gas is filled in the light-transmissive ceramic discharge vessel.

On the other hand, as such sealing configurations other than that as mentioned above, a high pressure discharge lamp wherein a sealing body which is made of cermet and a metal pipe acting as a current conductor are mounted on the end of a ceramic discharge tube (light-transmissive ceramic discharge vessel) has been disclosed in the Japanese Laid-Open Patent Application Hei 8-250068 (hereinafter referred to as Prior Art I). Moreover, a high pressure discharge lamp wherein a metal rod is inserted in such a metal pipe has been disclosed in the Japanese Laid-Open Patent Application Hei 10-334852 (hereinafter referred to as Prior Art II). Then, the metal pipe itself is fused to seal the ceramic discharge tube.

The Prior Art II discloses that when the high pressure discharge lamp disclosed in the Prior Art I is applied to the metal halide lamp, a metal rod is inserted in the metal pipe in order to reduce conductance inside of the metal pipe, so as to prevent some problems such as a reduction in luminous efficiency by the metal halogen flocculating in the metal pipe which becomes the lowest temperature portion during the operation of the lamp.

Further, a technique to fuse both of a metal lead to which an electrode rod is connected and the metal pipe by heat is shown in FIGS. 9 and 10 of the EP 982278A1 (hereinafter referred to as Prior Art Ill). Furthermore, it is disclosed that it has a coupling configuration which a first member made of ceramics or cermet and a second member made of a metal are connected together by interposing a main phase that contacts with the first member and an intermediate glass member that contact with the second member. Here, the intermediate glass member, that contact with the second member, is interposing between the second member and the main phase that has a porous skeleton configuration made from a sintered metal powders with an opening to which a glass phase is sunk.

Furthermore, a metal halide lamp wherein two ends of a light-transmissive ceramic arc tube are closed by ceramic plugs, through the ceramic plugs molybdenium exhaust pipes are fused, and electrode core rods are welded to inner ends of the ceramic plugs, is described in the Japanese Laid-Open Patent Application Hei 10-284004 (hereinafter referred to as Prior Art IV).

Furthermore, a technique to fuse by heat both of a metal lead to which an electrode rod is connected and the metal pipe is disclosed in FIGS. 9 and 10 of the EP 982278A1 (hereinafter referred to as Prior Art III).

In the high pressure discharge lamp discussed in the 6994 Prior Application, since the thin cylindrical portion becomes relatively longer in comparison to the enclosure, dead spaces tend to become broader in case of miniaturization.

On the contrary, the high pressure discharge lamps disclosed in the Prior Arts I, II and III are suitable for miniaturization in a point that it does not need a longer thin cylindrical portion. However, these Prior Arts do not mention to a relation between the luminous efficiency as a metal halide lamp, the lowest temperature portion to determine the luminous color and a sealing configuration.

That is the Prior Arts I–III are not able to rise the temperature of the lowest temperature portion by using w fusing configuration.

Under the circumstances, as a result of a meticulous research for such sealing configurations using a metal pipe, the inventors of the present invention have accomplished the present invention.

As a result of the research, it was proved that the Prior Arts I and II ware much the same. That is, in the high pressure discharge lamp disclosed in the Prior Art II, since the electrode is shorter than the metal pipe, there is left a gap, which becomes a capacity permitting aggregation of metal halide inside of the metal pipe. Then, if the electrode is extended in the metal pipe, the same effect as the case or the Prior Art II that the metal rode is inserted in the metal pipe is achieved.

Further, it is not mentioned about the causes or conditions for forming the lowest temperature portion in the metal pipe in the Prior Art II. According to the studies of the inventors, it was found that even in the high pressure discharge lamp disclosed in the Prior Art II, the lowest temperature portion might to be formed in the enclosure depending on the size of the light-transmissive ceramic discharge vessel and the metal pipe. Thus, it is proved that the techniques disclosed in the Prior Arts do not always achieve enough luminous efficiency, but also not suppress the difference of the luminous color at the time of changing the lighting direction.

Furthermore, the Prior Art IV is different from the present invention by that the Prior Art IV has a configuration of sealing the arc tube made of light-transmissive ceramics by a ceramic plug. The Prior Art IV is also different from the present invention in the inventive subject by that the Prior Art IV is subjected for preventing cracks of molybdenium exhaust pipe passing through the ceramic plug. On the other hand, the present invention is subjected for achieving a high luminous efficiency by raising a lowest temperature portion as described later. The Prior Art IV also has a problem that the exhaust pipe cannot be thickened because that the electrode is welded to a part of the inner wall of the exhaust pipe and thus placed eccentric from the axis of the arc tube.

SUMMARY OF THE INVENTION

The present invention has an object to improve the light-transmissive ceramic discharge vessel and the sealing configuration for providing a high pressure discharge lamp, high pressure discharge lamp lighting device, and a luminaire, which have an excellent luminous efficiency and/or a desired luminous color, and also, albeit compact, suppress the difference of the luminous color due to lighting directivity.

Further, the present invention has another object to provide a high pressure discharge lamp, a high pressure discharge lamp lighting device, and a luminaire which have longer life-expectancy.

A high pressure discharge lamp according to the first aspect of the invention is comprised of a light-transmissive ceramic discharge vessel with an envelope having a maximum outer diameter D1 and open ends, a metal pipe disposed in each or the open ends, respectively each metal pipe having a first end, i.e., a top end fused, located in one of the open ends of the light-transmissive ceramic discharge vessel and a second end, i.e., a base end protruding from the light-transmissive ceramic discharge vessel, a plurality of electrodes each having a first end, i.e., a base end connectively supported on the base end connected to a corresponding metal pipe and a second end, i.e., a top end extending within the light-transmissive ceramic discharge vessel, and a discharge agent which is filled in the light-transmissive ceramic discharge vessel, wherein it is also characterized by that the high pressure discharge lamp has an overall length L1, and the overall length L1 and the maximum outer diameter of D1 satisfy a following equation.

$$1.5 \leq L1/D1 \leq 4.5$$

Operation

In the high pressure discharge lamp according to the first aspect of the invention, since it defines the ratio L1/D1 of the maximum diameter D1 of the enclosure of the light-transmissive ceramic discharge vessel to the overall length L1 of the high pressure discharge lamp in a range from 1.5 to 4.5, it is able to define the temperature of the lowest temperature portion high, so as to achieve the high luminous efficiency and/or a desired luminous color. Further, since the temperature of whole high pressure discharge lamp is comparatively equalized, the temperature of the lowest temperature portion does not change a lot even when the lighting direction of the high pressure discharge lamp is changed from a horizontal to downward, so that the difference of the luminous color is decreased.

On the contrary, if the ration L1/D1 is less than 1.5, the distance between a hot positive column and the wall of the enclosure of the light-transmissive ceramic discharge vessel is expanded. Thus, the lowest temperature portion is easily formed in the enclosure, and the temperature of the lowest temperature portion lowers, so that the luminous efficiency and the lighting color change are increased. In addition, since an excessive discharge agent coagulates in a liquid-phase in the lower portion of the enclosure which is used as the lowest temperature portion during the horizontal lighting operation, and casts a shadow on light radiating surface, the light distribution is deteriorated. Thus this case is unfavorable.

On the other hand, if the ratio L1/D1 is higher than 4.5, the lowest temperature portion is easily formed in the metal pipe, and the temperature lowers. Then, the luminous efficiency also lowers, and the luminous color change increases. Thus this case is also unfavorable.

The tendency mentioned above could be thought that the portion where the lowest temperature portion is formed and its temperature depend on the distance from the positive column, the heat capacity of whole high pressure discharge lamp, and the balance of the bulb wall load, after all, they depend on the ratio L1/D1, since the light-transmissive ceramics that is a components of the discharge vessel has a better thermal conduction than a silica glass, and the metal pipe has also excellent thermal conduction. The operations and effects mentioned above do not change in any lighting method of the high pressure discharge lamp, for instance, they do not change even though the lighting frequency is high of 45 kHz or it is low of 50 Hz. Furthermore, they do not change even it is an AC lighting or DC lighting. Moreover, it shows the same tendency even when the bulb-wall loads are any within the range of at least 10 to about 45 W/cm2.

The high pressure discharge lamp according to the second aspect of the invention is characterized by that, further to the high pressure discharge lamp according to the first aspect of the invention, the overall length L1 of the discharge lamp is less than 30 mm.

This aspect of the present invention defines the overall length of the high pressure discharge lamp in the range mentioned above. When the overall length is within the range, it is able to achieve an effect to define the ratio L1/D1 in the first aspect of the invention remarkably.

The high pressure discharge lamp according to the third aspect of the present invention, comprising a light-transmissive ceramic discharge vessel with an envelope and open ends, a metal pipe having one end, i.e., a top end fused in the open end of the light-transmissive ceramic discharge vessel and the other end, i.e., a base end protruding from the light-transmissive ceramic discharge vessel, a pair of electrodes each having one end, i.e., a base end connectively supported on the base end of the metal pipe and the other end, i.e., a top end extending within the light-transmissive ceramic discharge vessel, a discharge agent which is filled in the light-transmissive ceramic discharge vessel, and wherein the overall length L1 of the discharge lamp is less than 30 mm, and the temperature difference between the highest temperature portion and the lowest temperature portion is less than 400 degrees during the operation of the lamp.

Here, when sealing the light-transmissive ceramic discharge vessel using a frit glass, i.e., a ceramic sealing compound, if the frit glass, e.g., a composed of SiO2—Al2O3—Dy2O3, is not kept below 700 degree, leaks become remarkable during the life of the discharge lamp. This is because the lowest temperature portion is formed near the frit glass portion and these temperatures are linked each other. If the temperature of the flit glass portion lowers, the temperature of the lowest temperature portion will also lower, and also the luminous efficiency will lowers with the temperature lowering of the lowest temperature portion.

On the other hand, the maximum operation temperature of the light-transmissive ceramic discharge vessel is about 1200 decree when the light-transmissive ceramics is made of alumina. If it is more than 1300 degree, it would cause sublimation or crack, so that it is impossible to achieve sufficient life characteristic. Therefore, in designing the high pressure discharge lamp, it is necessary to take into consideration the balance of two matters mentioned above. In summary, in a configuration as discussed in the 6994 Prior Application, the lowest temperature portion will be 700 degree, and the highest temperature portion will be 1200 degree. It is necessary to form the difference about 500 degree between them.

However, in a compact high pressure discharge lamp having the overall length of less than 30 mm and lamp power of about 20 W, it was difficult to make the temperature difference mentioned above. That is, since the light-transmissive ceramics has an extremely better thermal conduction rate than the silica glass, it is hard to make the temperature difference in a material level. Further, when the operation temperature of the light-transmissive ceramics discharge vessel is tried to be controlled by the shape of the enclosure or the length of the thin cylindrical portion, it causes a drawback such as lowering the ratio of the light-emitting portion to the high pressure discharge lamp in size, in other words, enlarging a dead space. As a result, the luminous efficiency is also lowered. Further, if the temperature difference becomes wide, the thermal stress of each portion will be enhanced. When things come to worst, the crack might occur.

On the contrary, in a high pressure discharge lamp according to the third aspect of the invention, the electrode is coupled to the high pressure discharge lamp by using a metal pipe which seals the light-transmissive ceramic discharge vessel, and its overall length is less than 30 mm. Further, since it defines the temperature difference between the highest temperature portion and the lowest temperature portion during the operation of the lamp less than 400 degree, it is able to define the lowest temperature portion higher than the case of using the frit glass for it. Therefore, the luminous efficiency is enhanced, and the temperature difference in the light-transmissive ceramics discharge vessel lowers, so as to lower the possibility to cause the crack.

In addition, in this third aspect of the invention, the temperatures of the highest portion and the lowest temperature portion is achieved by measuring the temperature of the outer portion of the high pressure discharge lamp by using a radiation thermometer.

In this aspect of the invention, the electrodes are connectively supported on the sealing portions of the base ends of the metal pipes. Accordingly, it is possible to simultaneously execute the fusing between the electrodes and the base ends of the metal pipes and the supporting of the electrodes. For example, the simultaneous execution of the fusing between the electrodes and the base ends of the metal pipes and the supporting of the electrodes can be made by previously fixing the fusing metal for fusing the metal pipe on the base end of the electrode, then placing the electrode in the light-transmissive ceramic discharge vessel and then melting the fusing metal by heat.

The high pressure discharge lamp according to the forth aspect of the present invention, comprising a light-transmissive ceramic discharge vessel with an envelope and open ends, a metal pipe made of a metal having a melting point of T1, whose one end, i.e., a top end is fused in the open end of the light-transmissive ceramic discharge vessel and whose other end, i.e., a base end is protruding from the light-transmissive ceramic discharge vessel, a fusing metal, made of a metal having a melting point of T2, which seals the base end of the metal pipe, a pair of electrodes each having one end, i.e., a base end connectively supported on the base end of the metal pipe via fusing metal and the other end, i.e., a top end extending within the light-transmissive ceramic discharge vessel, and a discharge agent which is filled in the light-transmissive ceramic discharge vessel, wherein it is characterized by that the melting point of T1 of the metal pipe and the melting point of T2 of the fusing metal satisfy a following equation.

$$T1>T2$$

The present invention provides a suitable configuration for sealing the metal lamp and coupling the electrode to the metal pipe. That is, the base end of the metal pipe is sealed by the fusing metal. When the relation between the melting point T1 of the metal pipe and the melting point T2 of the fusing metal satisfies the condition shown by the above-mentioned equation, it is able to perform the fusing splicing of the fusing metal to the metal pipe easily and certainly. Accordingly, the length of top end of the metal pipe protruding in the enclosure is shorten as much as possible, and it is possible to prevent the decrease of the strength of sealing the ends of the light-transmissive ceramic discharge vessel, e.g., the sealing of the thin cylindrical portion, the metal pipe, and the light-transmissive ceramic discharge vessel at the time of sealing the metal pipe by using the fusing metal, and it is also prevent causing the crack. Here, it is more preferable that the melting point T1 of the metal pipe and the melting point T2 of the fusing metal satisfy a relation given by an equation; $T1-T2 \geqq 500°$ C. That is, when the metal pipe is made of molybdenum or tungsten, it is preferable to be made of platinum or molybdenum.

To seal the base end of the metal pipe by using the fusing metal, a proper lump of the fusing metal is put on the opened end of the metal pipe, then the fusing metal is heated by the laser-beam irradiation etc. Thus, since the perimeter of the lump of the fusing metal will be fused to the opened end of the metal pipe, so that the metal pipe is sealed.

On the other hand, the electrode is supported by coupled to the metal pipe by using the fusing metal. That is, the electrode is coupled to the metal pipe via the fusing metal wherein the base end of it is buried. Thus it is supported by one side by the metal pipe. To achieve the high pressure discharge lamp having the configurations mentioned above, For instance, the metal pipe is sealed to the thin cylindrical portion of the light-transmissive ceramic enclosure, next, the lump of the fusing metal is adhered on the basic end of the electrode, then the electrode is inserted vertically inside of the metal pipe through the opened base end of it. Then, in the state that the lump of the fusing metal is located on the opened end of the base end of the metal pipe, the fusing metal is heated to be fused by the laser-beam irradiation etc. Here, by performing the operations mentioned above in an atmosphere of an ambient gas, it is able to prevent the oxidization of the metal, so that the fusing splicing of the fusing metal to the metal pipe is performed certainly and the discharge agent is filled in the enclosure easily.

Thus, according to the present invention, sealing the metal pipe and coupling the electrode to the metal pipe will be easy, so that it will be easy to manufacture the high pressure discharge lamp.

The high pressure discharge lamp according to the fifth aspect of the present invention is characterized by that further to the high pressure discharge lamp according to the fourth aspect of the invention, when the length of the electrode is L3, and the length L4 of the fusing metal in the bulb axis direction, it satisfies a following equation.

$$L3>L4$$

In this fifth aspect of the invention, the length of the fusing metal L4 is defined by comparing to the length L3 of the electrode. That is, within the range satisfying the equation mentioned above, the length of the fusing metal does not have an adverse effect to support the electrode. However, if the length L4 of the fusing metal exceeds the length L3 of electrode, it will easy to cause the electrode off-centered from the bulb axis according to the deformation of the fusing metal at the time of fusing the fusing metal, or it will also easy to cause the dispersion of the electrodes according to the undesirable change of the distance between electrodes. Further, if the fusing metal is long, its reaction to the erosion causes a blackening, and it might to cause a trouble to a life characteristic.

In this fifth aspect of the invention, the length L3 of the electrode is the portion exposed from the fusing metal even though its base end is buried in the fusing metal.

The high pressure discharge lamp according to the sixth aspect of the invention, is characterized by that, further to the high pressure discharge lamp according to any one of the first to fifth aspects of the invention, a light-transmissive ceramic discharge vessel is provided with a thin cylindrical portion with an outer diameter D2 formed at the end of the enclosure, and a metal pipe with outside diameter D3 which is inserted in a thin cylindrical portion of the light-transmissive ceramic discharge vessel for closing the end of the light-transmissive ceramic discharge vessel, wherein the ratio of the outer diameter D2 of the thin cylindrical portion and the outer diameter D3 of the metal pipe satisfies a following equation.

$$1.5 \leq D2/D3 \leq 4.0$$

The thin cylindrical portion is generally formed at the both ends of the enclosure of the light-transmissive ceramic discharge vessel. If needed, a pair of the thin cylindrical portions may be formed at one end of the enclosure, or a single but large sized thin cylindrical portion may be formed.

The top end of the metal pipe is inserted into the thin cylindrical portion and sealed thereto via a sealing layer which is primarily made of, e.g., a cermet. Here, the cermet is a composite material of ceramics powder and metal powder which are pressed and sintered, and it includes a heat-resistant of the ceramics and a toughness of the metal. As the ceramics, it is able to use a ceramics which is same as or similar to the light-transmissive ceramics. Further as the metal, it is able to use the same metal as the metal pipe or an alloy having the similar characteristics as the metal pipe.

Therefore, when interposing a sealing layer which is primarily made of a cermet between the thin cylindrical portion and the metal pipe, an inclination configuration is formed between them, so as to achieve a suitable sealing. Further, the above mentioned composite configuration which is disclosed in the Prior Art III is able to be adapted to the sealing layer. In addition, if needed, the outside of the sealing layer is covered with a sealant of a ceramic sealing compound at the end of the thin cylindrical portion. Accordingly, the sealing of the thin cylindrical portion and the metal pipe is reinforced, so that the hermetically reliability is enhanced all the more.

Furthermore, the present invention defines a suitable condition between the outer diameter of the thin cylindrical portion D2 and the outer diameter of the metal pipe D3. That is, within the range mentioned above, it does not cause the crack on the thin cylindrical portion, even though the thermal stress is generated by the temperature change at the time of blinking during the operation of sealing and lighting. On the other hand, if the ratio D2/D3 is less than 1.5, the thickness of the thin cylindrical portion becomes thinner than that of the metal pipe, therefore the mechanical strength is insufficient, so that it will be easy to cause the crack on the light-transmissive ceramic discharge vessel by thermal stress that occurs according to the temperature change during the operation of sealing of the thin cylindrical portion and the metal pipe or the time of blinking.

Furthermore, if the ration D2/D3 exceeds 4.0, the thickness of the thin cylindrical portion becomes relatively thick, therefore the temperature gradient between the inner surface and the outer surface of the thin cylindrical portion is increased during the operation of the sealing or at the starting operation. Accordingly, the thermal stress generated in such cases exceeds the maximal acceptable strength of the light-transmissive ceramic discharge vessel, whereon the crack will be easily caused.

A high pressure discharge lamp according to the seventh aspect of the invention, is characterized by that further to the high pressure discharge lamp according to any one of the first to sixth aspects of the invention, the electrode, whose overall length L3 is equal to or longer than 4 mm, is comprised of an electrode base-rod having a diameter D4 of less than 0.3 mm, and an electrode principal portion which is placed at the end of the electrode base-rod.

In a configuration wherein the metal pipe is used for sealing the light-transmissive ceramic discharge vessel and for supporting the electrode also, not only the electrode and metal pipe, but a feeder lead coupled to the metal pipe works as an electrode while the glow-arc transition. Taking this into consideration, the electrode needs to be constituted appropriately.

However, if the electrode is constituted inappropriately, the glow-arc transition time becomes longer, it might to cause a blackening due to a spattering of the metal pipe or the electrode by the ion impact in a glow discharge or a leak due to the consumption of the metal pipe. According to the studies by the inventor of the present invention, the cause of extending the time of the glow-arc transition is assumed to be increased amount of the thermal conduction from the electrode to the metal pipe. That is, in a glow discharge until around the tip end of the electrode reaches to a glow-arc transition temperature and migrates to an arc discharge, the heat is easily conducted excessively from the electrode to the metal pipe.

In the present invention, since it is provided with the configuration mentioned above, it is able to reduce the thermal conduction quantity during the glow discharge, so that the glow-arc transition time is hard to be extended.

The high pressure discharge lamp according to the eighth aspect of the present invention, is characterized by that further to the high pressure discharge lamp according to any one of the first to seventh aspects of the invention, the metal pipe satisfies a following equation with its length L2 (mm) that is exposed outside the light-transmissive ceramic discharge vessel.

$$1.0 \leq L2 \leq 4.0$$

The eighth aspect of the present invention reduces as short as possible the a portion of the metal pipe exposed outside the light-transmissive ceramic discharge vessel to miniaturize the high pressure discharge lamp, and limits the length L2 of the metal pipe exposed outside the light-transmissive ceramic discharge vessel in the range given in the above equation. Therefore, it is able to prevent the decrease of the strength at the ends of the light-transmissive ceramic discharge vessel, e.g., the thin cylindrical portions themselves, or the sealing layer for sealing the metal pipe due to the thermal shock caused at the time of sealing the metal pipe.

On the contrary, if the length L2 is less than 1 mm, it causes the decrease of the strength at the end of the light-transmissive ceramic discharge vessel, e.g., the thin cylindrical portion itself or the sealing layer for sealing the metal pipe. If things come to worst, the cracks occur on the light-transmissive ceramic discharge vessel, or the sealing layer is felt off. Further, if the length L2 is more than 4 mm, the lowest temperature portion is easy to be formed in the metal pipe, so that the luminous efficiency is easily lowered. In addition, the overall length of the high pressure discharge lamp is enlarged, and the dead space is increased, so that it causes a trouble for miniaturization.

A high pressure discharge lamp according to the ninth aspect of the invention is characterized by that, further to the high pressure discharge lamp according to any one of the first to eighth aspects of the invention, its linear transmittance of the enclosure is set to at least 30% or more.

A high pressure discharge lamp according to the ninth aspect of the invention defines a configuration wherein its light condensing efficiency is enhanced further. That is, if the linear transmittance of the enclosure is set to 30% or more, arc's scale effect between electrodes will arise, so that it is able to achieve a high light condense. Thus, the higher linear transmittance is able to be achieved by using e.g., YAG as a light-transmissive ceramics.

Therefore, according to the ninth aspect of the invention, it is able to achieve an still further concentrated point-source featured high pressure discharge lamp, and for instance, it is suitable for a light source for optical fibers.

On the contrary, the linear transmittance of the light-transmissive alumina ceramic is about 15%. Even though 20% of its linear transmittance could be achieved by ground, it still has an effect of a scattered light, so that it is hard to achieve high light condensing.

A high pressure discharge lamp according to the tenth aspect of the invention, is characterized by that, further to the high pressure discharge lamp according to any one of the first to ninth aspects of the invention, a pair of electrodes is asymmetrical whereof one is relatively a thick rod, and the other one is a thin rod.

This tenth aspect of the invention defines a high pressure discharge lamp provided with an electrode configuration which is suitable for DC lighting. That is, in case of DC lighting, since a positive pole is heated to a high temperature in order that a large amount of current flow through there due to flowing electrons, it is common to enlarge an anode compared with a negative pole. A conventional high pressure discharge lamp adopts a configuration to put a positive pole principal portion having a big diameter at the tip end of the electrode base-rod. However, in a case of a compact high pressure discharge lamp having the lamp power of about 20 W and the overall length L1 of about 30 mm, the electrode is relatively short, so that it becomes hard to provide asymmetrical pair of electrodes.

Thus, in the present invention, both of the positive and negative poles are formed with rods with relatively different diameters. That is, the relatively thick road is used for the positive pole of the electrodes, and relatively thin rod is used for the negative pole, so as to perform DC lighting. In DC lighting, a high-pressure chopper or a step-up chopper is able to be used for a lighting circuit, and thus it is able to simplify a circuit arrangement and miniaturize it, compared with AC lighting.

A high pressure discharge lamp according to the eleventh aspect of the invention, is characterized by that further to the high pressure discharge lamp according to any one of the first to tenth aspects of the invention, it is provided with a feeder lead having a cross-sectional area narrower than the overall cross-sectional area of the metal pipe and lead out from the metal pipe.

The eleventh aspect of the invention provide a configuration for decreasing as low as possible a thermal influence of the feeder lead for feeding the electrode against the metal pipe.

The inventors of the present invention have learned from studies that when the feeder lead is coupled to the metal pipe both of them are thermally conducted, then the heat of the metal pipe decreases by transferring to the feeder lead, thus the luminous efficiency of the high pressure discharge lamp decreases. Hence, the inventors have devised the present invention through various developments. That is, by adopting the above aspect of the invention, the heat quantity transferring from the metal pipe to the feeder lead relatively lowers, and thus it is able to achieve a high luminous efficiency and/or a desired luminous color by keeping the metal pipe in a desired temperature. Here, the term "overall cross-sectional area" means a cross-sectional area of an interior defined by the outer shape of the metal pipe. Thus, it is not directly related to the wall thickness of the metal pipe. However, when considering that the metal pipe is acted upon by the internal pressure of the discharge vessel, and thus as a matter of course the metal pipe has a wall thickness enough to endure the internal pressure, it is understood that the overall cross-sectional area has a value proportional to the cross-sectional area of the wall portion of the metal pipe.

A high pressure discharge lamp according to the twelfth aspect of the invention, is characterized by that further to the high pressure discharge lamp according to any one of the first to eleventh aspects of the invention, it is provided with a heat insulator which covers the outer surface of the portion of the metal pipe exposed outside the end portion of the light-transmissive ceramic discharge vessel.

The heat insulator may be any material, if it is a material with a thermal conductivity lower than that of the metal pipe. However, it is desirable to use a compression molding of metallic oxide particles or metallic particles or a coating film primarily comprised of metallic oxide particles. Further, though it is not limited but preferable that the heat insulator entirely covers the exposed portion of the metal pipe. That is, it is essential that the insulator covers a principal portion of metal pipe. Therefore, a part of the metal pipe is left exposed without being covered by heat insulator.

Though it is able to keep the temperature of the lowest temperature portion high so as to achieve the high luminous efficiency and/or a desired luminous color by closing the ends of the light-transmissive ceramic discharge vessel with a metal pipe and defining the relation of the overall length L1 of the high pressure discharge lamp and the temperature difference of the highest temperature and the lowest temperature portion, or the relation of the melting point T1 of the metal pipe and the melting point T2 of the fusing metal within a prescribed region, if it is able to further rise the temperature of the metal pipe by a heat insulator it is more favorable for the luminous efficiency and the luminous color.

Therefore, in this embodiment it is able to restrict the temperature lowering of the metal pipe due to the heat dissipation, and thus it is able top keep lowest temperature portion in still higher temperature. As a result, it is able to keep the luminous efficiency and/or the luminous color of the high pressure discharge lamp in more favorable states.

A high pressure discharge lamp lighting device according to the thirteenth aspect of the present invention, comprising a high pressure discharge lamp according to any one of the first to eleventh aspects of the invention, and a lighting circuit which biases a high pressure discharge lamp, and which has a crest value of the starting voltage of 15 kVp-p or more.

For instance, in order to instant re-light the high pressure discharge lamp used for a mobile headlight, a starting voltage which crest value is 15 kVp-p or more is applied. However, the high pressure discharge lamp provided with a light-transmissive ceramic discharge vessel is weak to the thermal shock at a starting operation, and easy to be cracked. Although such a problem could be solved, its application was limited since it was subjected to many restrictions such as the size, or it had few margins for the design.

In a high pressure discharge lamp according to the eleventh aspect of the present invention, the thermal conduction among the electrode, the metal pipe and the light-transmissive discharge vessel are good, and it is hard to have temperature differences, so that the temperature during the operation of the lamp will relatively equal. Therefore, we have learned that the high pressure discharge lamp has high resistance over the thermal and electric shocks such as starting or blinking of the lamp. Such a result is acquired remarkably in a combination with a lighting circuit having the crest value of the starting voltage of 15 kVp-p or more.

In this aspect of the invention, the lighting circuit for the high pressure discharge lamp can adopt various type of known circuit systems. For example, a high frequency AC lighting circuit, a low frequency AC lighting circuit and a DC lighting circuit are available. Furthermore, it is allowed to use in combination an igniter for supplying a start pulse voltage to the high pressure discharge lamp.

The high frequency AC lighting circuit primarily includes an inverter and an inductor suitable for lighting fluorescent lamps like compact single based fluorescent lamps with a high frequency ranging not less than 20 kHz to 200 kHz. According to this type of high frequency lighting circuit, it is able to reduce the size of the lighting apparatus and also the weight of the lighting apparatus. Thus, this sort of lighting circuit is very favorable to general purpose high pressure discharge lamp.

The low frequency AC lighting circuit is a type of lighting by a rectangular wave AC which is obtained by chopping a DC current at a low frequency. The frequency is generally less than around 500 Hz. The low frequency AC lighting circuit is able to reduce a flux rise time by supplying a lamp power 3.5 times of the rated lamp power at a starting of the lamp. Thus it becomes easy to control the lighting circuit. Accordingly this sort of lighting circuit is very favorable to automobile headlights.

The DC lighting circuit is a type of lighting by a DC power regulated by a chopper. This DC lighting circuit is not only favorable to operate a high pressure discharge lamp having an electrode structured for a DC lighting, but also favorable to automobile headlights and general purpose lighting apparatus since it is easy to control high pressure discharge lamps and is able to reduce the size and weight of the lighting apparatus.

Here, if required, the DC lighting circuit can adopt a AC-DC changeable lighting circuit which drives the lamp by a DC system at a stating time or for a prescribed time after the starting time, and after that drives the lamp by an AC system.

A luminaire according to the fourteenth aspect of the invention, comprising a luminaire principal body, the high pressure discharge lamp according to any one of the first to twelfth aspects of the invention which is supported by the luminaire principal body, and a lighting circuit which biases a high pressure discharge lamp.

In the fourteenth aspect of the invention, the term "luminaire" has a wide concept including any device for utilizing light radiated from the high pressure discharge lamp in one object or another. For instance, the luminaire is able to be adapted to a screw-base-mount type high pressure discharge lamp, a lighting apparatus, a mobile headlight, a light source for optical fibers, an image projecting device, an optic-chemical device, or a fingerprint discrimination device. The term "luminaire principal body" means a whole portion of the luminaire except the high pressure discharge lamp.

The term "screw-base-mount type high pressure discharge lamp" means the luminaire in which the high pressure discharge lamp and the stabilizer are merged together, and further provided with a screw-base for receiving power when coupled to a lamp socket, so as to allow to be used in similar manner to the ordinary incandescent lamp. In case of constituting the screw-base-mount type high pressure discharge lamp, it is able to provide a reflector for condensing light so as that the high pressure discharge lamp presents desired light distribution characteristics. Furthermore, for moderately reducing the brightness of the high pressure discharge lamp, it is able to provide a light diffusing glove, or a cover. Further, it is able to use a screw-base having desirable specifications. Accordingly, for replacing directly with conventional light-source lamps, a screw-base the same as that of the conventional light-source lamps is able to be adopted.

When the luminaire is a lighting apparatus, it may be configured that the lighting apparatus is provided with the luminaire, and coupled to the high pressure discharge lamp, or it may be coupled to the high pressure discharge lamp when it is not provided with the lighting circuit. Further, When the lighting apparatus is provided with a luminaire, the luminaire may be located in the lighting apparatus or a place apart from the light apparatus such as a behind of ceilings.

The lighting circuit may be configured that the high pressure discharge lamp is lighted with any of the high frequency or low frequency. Further, it may not be provided with an rapid re-lighting function.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DEFINITION OF TECHNICAL TERMS

Figure 1:
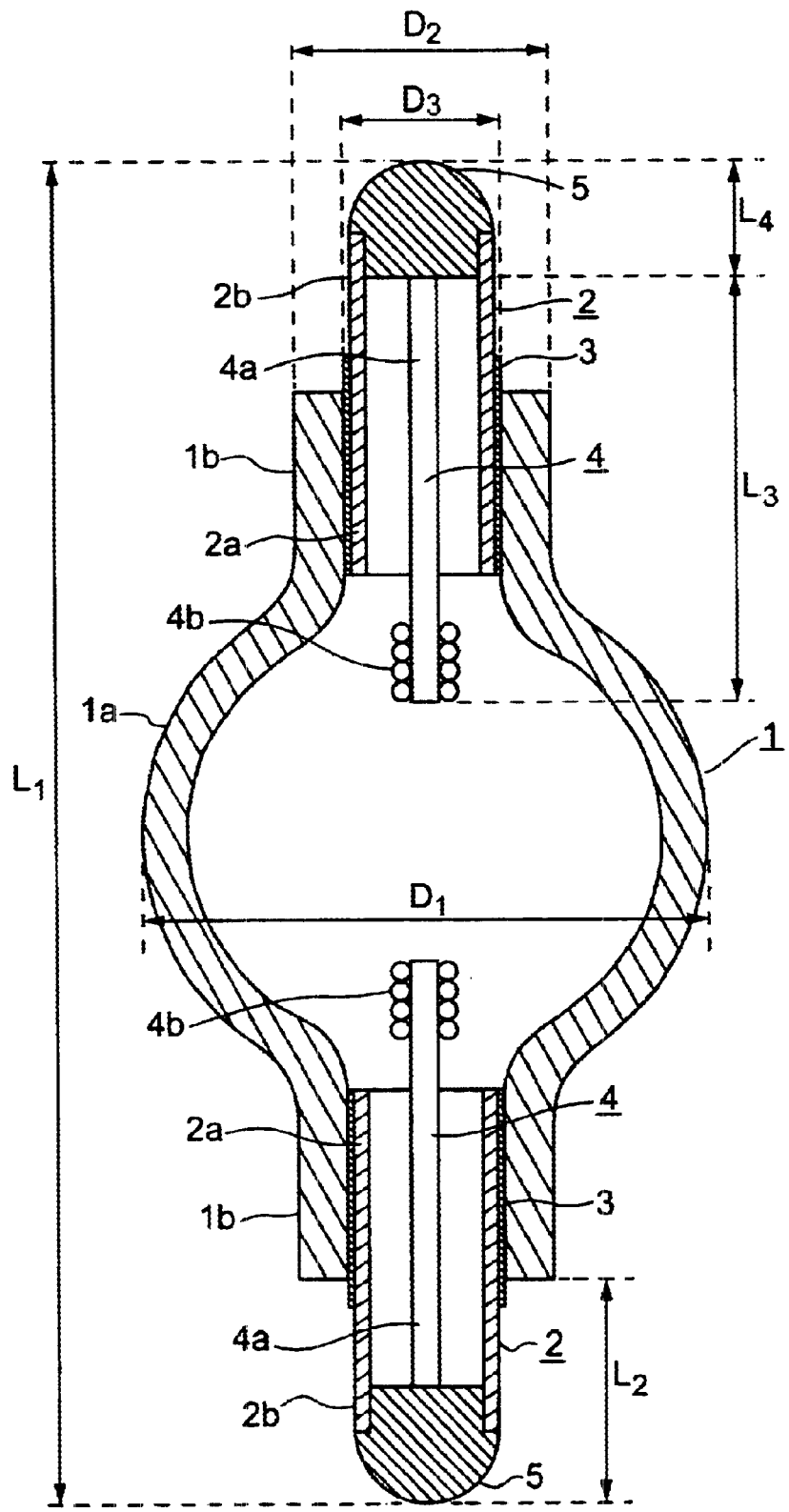
FIG. 1 is a front sectional view of a first embodiment of the high pressure discharge lamp according to the present invention.

In this aspect of the invention and other aspects of the invention as described later, some definitions and their technical meanings are presented for following specific terms, unless otherwise specified.

Light-Transmissive Ceramic Discharge Vessel

The term "light-transmissive ceramic discharge vessel" means a discharge vessel comprised of an enclosure which is made of mono-crystalline metal oxide e.g., sapphire, polycrystalline metal oxide, e.g., semi-transparent hermetic aluminum oxide, yttrium-aluminum garnet (YAG), yttrium oxide (YOX) and polycrystalline non-oxidic material, e.g., material having a light-transmissivity and a heat-resistance like aluminum nitride (AlN). Here, the term "light-transmissive" means transmissivity allowing light generated by a discharge to be led outside. Accordingly the term may include not only a transparency but also a light-diffusiveness. In addition, it is essential only that the enclosure has a transmissivity, while the enclosure can have a light blocking effect if it is provided with a supplemental configuration other than the enclosure.

Further, the enclosure of the light-transmissive ceramic discharge vessel defines a discharge space to surround a positive column mainly, which is generated between electrodes during the operation of the lamp. The enclosure is desirable to have an almost spherical shape in order to simplify the mode of an acoustic resonance frequency in case of lighting the high pressure discharge lamp at a high frequency region. Here, the term "almost spherical" means that the inner surface of the enclosure is shaped spherical, or it is shaped oval or ellipse which is similar to the spherical shape. However, if it is not necessary to simplify the mode of an acoustic resonance frequency, the shape of the enclosure is not limited to the spherical shape mentioned above, and it can adapt any type of a oval, ellipse, or spindle shape which are not similar to the spherical shape, or a cylinder shape which both ends are closed, as required or optionally.

The light-transmissive ceramic discharge vessel may be provided with, other than an enclosure, an accessory to which the metal pipe is inserted or fitted outside thereof, e.g., a small cylinder portion.

Further, in manufacturing the light-transmissive ceramic discharge vessel, the accessory may be integrated with the one or two ends of the enclosure at the first step when it is provided with any other accessory besides the enclosure. However, for instance, it is also able to make the integrated light-transmissive ceramic discharge vessel by provisionally sintering the enclosure and the accessory after appropriately assembling them step-by-step, and then finally sintering whole of them. Further, it is also able to make an integrated enclosure by provisionally sintering a cylindrical portion and end plate portion after appropriately fitting them step-by-step, and the finally sintering whole of them.

Metal Pipe

The metal pipe seals the ends of the light-transmissive ceramic discharge vessel and supports the electrode. To that end, the metal pipe has an open top end and a sealed base end is opened, and outside of it is sealed. The open top end of the metal pipe is fused to the light-transmissive ceramic discharge vessel and communicates to the interior of the light-transmissive ceramic discharge vessel. Accordingly, the open ends of light-transmissive ceramic discharge vessel are closed. In this case, the top end of the metal pipe may be any configuration capable of inserting inside or fitting outside of the end portion of the light-transmissive ceramic discharge vessel. On the other hand, the base end of the metal pipe is exposed outside the light-transmissive ceramic discharge vessel regardless of the configuration of the top end of the metal pipe.

Since the top end of the metal pipe communicates with the interior of the light-transmissive ceramic discharge vessel, as can be seen from the above-mentioned configuration, the metal pipe is desirable to be made of a metal which is refractory and corrosion-resistive against the discharge agent, and has a thermal expansion coefficient relatively close to that of the light-transmissive ceramic discharge vessel. For instance, the metal pipe is able to be made of a refractory metal such as molybdenum or tungsten.

Furthermore, the sealing configuration between the top end of the metal pipe and the light-transmissive ceramic discharge vessel is free. For example, it may be any configuration selected from those listed below.

Configuration-I—by forming the thin cylindrical portion as an accessory of the light-transmissive ceramic discharge vessel, the top end of the metal pipe is inserted into the thin cylindrical portion, then the portion where the top end is inserted is sealed, Configuration-II—the top end of the metal pipe is fit on the thin cylindrical portion, then the fit portion is sealed;

Configuration-III—variation of the Configuration-II, wherein a refractory metal cover is put on the top end of the light-transmissive ceramic enclosure for closing the top end.

Here, the refractory metal cover and the metal pipe may be integrally formed by press-shaping work. Or they may be separately formed and then merged into one piece by welding etc.

For sealing the metal pipe with the light-transmissive ceramic discharge vessel, it is able to use a cermet, or a combination of a cermet and a ceramic sealing compound. Here, as the configuration of the latter example, it is able to use a technique disclosed in e.g., the Prior Art III.

On the other hand, the base end of the metal pipe may be any sealing configuration. For instance, the base end of the metal pipe can be sealed by welding after pinching, or by directly fusing. Otherwise, the base end of the metal pipe can be sealed via a fusing metal.

Here, the term "fusing metal" means a metal which is able to be hermetically fused to the metal pipe. Though the fusing metal is not limited to a specific, it is preferable to use a metal having a melting point lower than that of metal pipe and a refractoriness capable of resisting a temperature under normal operating conditions. For example, platinum, an alloy of platinum and molybdenum or the like is suited for the fusing metal.

Electrodes

A pair of electrodes each having one end, i.e., a base end connectively supported on the base end of the metal pipe and the other end, i.e., a top end extending within the light-transmissive ceramic discharge vessel; and Any structure can be used for connecting the base end of the electrode to the sealing portion of the metal pipe.

Further, the pair of electrodes is composed of an electrode base-rod and an electrode principal portion. The electrode base-rod is shaped a slender rod, and constitutes the base end and the mid-portion of the electrode. Further, it is able to constitute an electrode base-rod by a single or combination of some of the conductive refractory materials such as tungsten, doped tungsten, molybdenum, or cermet as needed. On the contrary, the electrode principal portion, which is placed at the end of the electrode base-rod, operates mainly as the negative pole and/or the positive pole, and it constitutes the top end of the electrode. Further, the electrode principal portion can be made of tungsten, doped tungsten rhenium or tungsten rhenium. The top end of the electrode, that is the electrode principal portion, could be wound thereon a coil made of tungsten as needed, so as to enlarge its surface area to enhance heat dissipation.

Furthermore, the pair of electrodes is symmetrical in case of AC lighting type, and it is unsymmetrical in case of DC lighting type.

Discharge Agent

The discharge agent may be a mixture of a luminous metal halide, a lamp voltage formation agent and a rare gas, respectively having a composition described below. That is, the luminous metal halide is a halide of luminous metal which emits visible light. The lamp voltage formation agent may be primarily composed of mercury or halide. Mercury may also contribute as a luminous metal, as described later. For the halide as the lamp voltage formation agent, a metal having a relatively high vapor pressure during operation and a relatively little emission of visible light, for example, Al, Fe, Zn, Sb, Mn etc. is suitable. A rare gas functions as a starting gas and buffer gas. For the rare gas, a xenon, an argon, or a krypton could be used alone or mixed with any other thereof. Here, the term "high pressure discharge" means a discharge wherein the pressure of an ionizing agent during the operation of the lamp becomes higher than the atmospheric pressure, that is, it is a concept including a very-high-pressure discharge.

1. The luminous metal halide+mercury+a rare gas: This is so called a configuration of a metal halide lamp.

2. Luminous metal halide+lamp voltage formation agent+ rare gas: This is a configuration of a mercury-free metal halide lamp which does not use a mercury having high environmental load (pollution).

3. A mercury+a rare gas: This is so-called a configuration of a high-pressure mercury lamp.

4. A rare gas: If Xe is used as a rare gas, it is so-called a configuration of a xenon lamp.

As a halogen for the luminous metal halide, it is able to use one or a plurality from an iodine, a bromine, a chlorine and a fluorine. The metal halide of a luminous metal is able to be selected from a group of known metal halide, in order to achieve a radiation provided with a desired lighting characteristics about a luminous color, an average color rendering evaluation index Ra and a luminous efficiency, and further in response to the size and the input power of the discharge lamp light-transmissive ceramic discharge vessel For instance, one or a plurality of halides selected among a group of a Na-halide, a Li-halide, an Sc-halide or rare-earth metal-halides could be used.

Other Configurations

In the present invention, although it is not a requirements, a part or all of the following configurations are able to be provided as needed.

(1) Start Support Conductor

Generally, when the inside diameter of the enclosure of the light-transmissive ceramic discharge vessel is enlarged relatively, and the distance between electrodes is also relatively enlarged corresponding to enlargement of the inside diameter of the enclosure, the starting voltage of the high pressure discharge lamp tends to rise. Thus, by placing a starting support conductor as needed, it is able to reduce the starting voltage.

(2) Jacket-Bulb

The high pressure discharge lamp according to the present invention is able to be constituted to be lighted in a state that the light-transmissive ceramic discharge vessel is exposed into air. However, if needed, it is able to accommodate the light-transmissive ceramic discharge vessel in the jacket bulb hermetically. Here, even in the case of adding the jacket bulb, the overall length L1 of the high pressure discharge lamp according to the present invention represents length of the components consisting primarily of the light-transmissive ceramic discharge vessel and the metal pipe. In addition, by using the inner surface of the jacket bulb as a reflecting surface which takes its focus on the light-emitting portion of the high pressure discharge lamp, it is able to achieve a directional lighting high pressure discharge lamp.

As a suitable example for a compact high pressure discharge lamp, the jacket bulb may be provided with a evacuation pinch-off portion on its top end and a pinch-sealed portion on its base end. In this configuration of the jacket bulb, by restricting the distances between a luminescent center defined in the light-transmissive ceramic discharge vessel and the evacuation pinch-off portion and the pinch-sealed portion below 15 mm, it becomes easy to keep the temperature of the metal pipe high. That is, a great mass of glass concentrate on the evacuation pinch-off portion and the pinch-sealed portion of the jacket bulb, and thus the evacuation pinch-off portion and the pinch-sealed portion have a high thermal capacity. Hence, by locating the metal pipe within 15 mm from the evacuation pinch-off portion and the pinch-sealed portion, the metal pipe is kept in higher temperature by being heated by heats of the evacuation pinch-off portion and the pinch-sealed portion. As a result, the temperature of the lowest temperature portion rises, and thus it is able to achieve a high luminous efficiency and/or a desired luminous color. Here, the distances between metal pipe and the evacuation pinch-off portion and the pinch-sealed portion are curtate distances thereof.

(3) Reflector

Since the high pressure discharge lamp according to the present invention is relatively shorter in length to the maximum diameter of the light-transmissive ceramic discharge vessel, it is able to miniaturize the reflector remarkably. In addition, it is able to be merged with the reflector if needed. In this case, the reflector may be formed on the inner surface of the jacket bulb which accommodates the light-transmissive ceramic discharge vessel therein. Otherwise, the high pressure discharge lamp may be attached in the reflector which is formed separately.

DESCRIPTION OF THE PREFERRED EMBODIMENTS

Referring now to the attached drawings, FIGS. 1 to 12, some embodiments of the present invention will be explained hereinafter.

Figure 2:
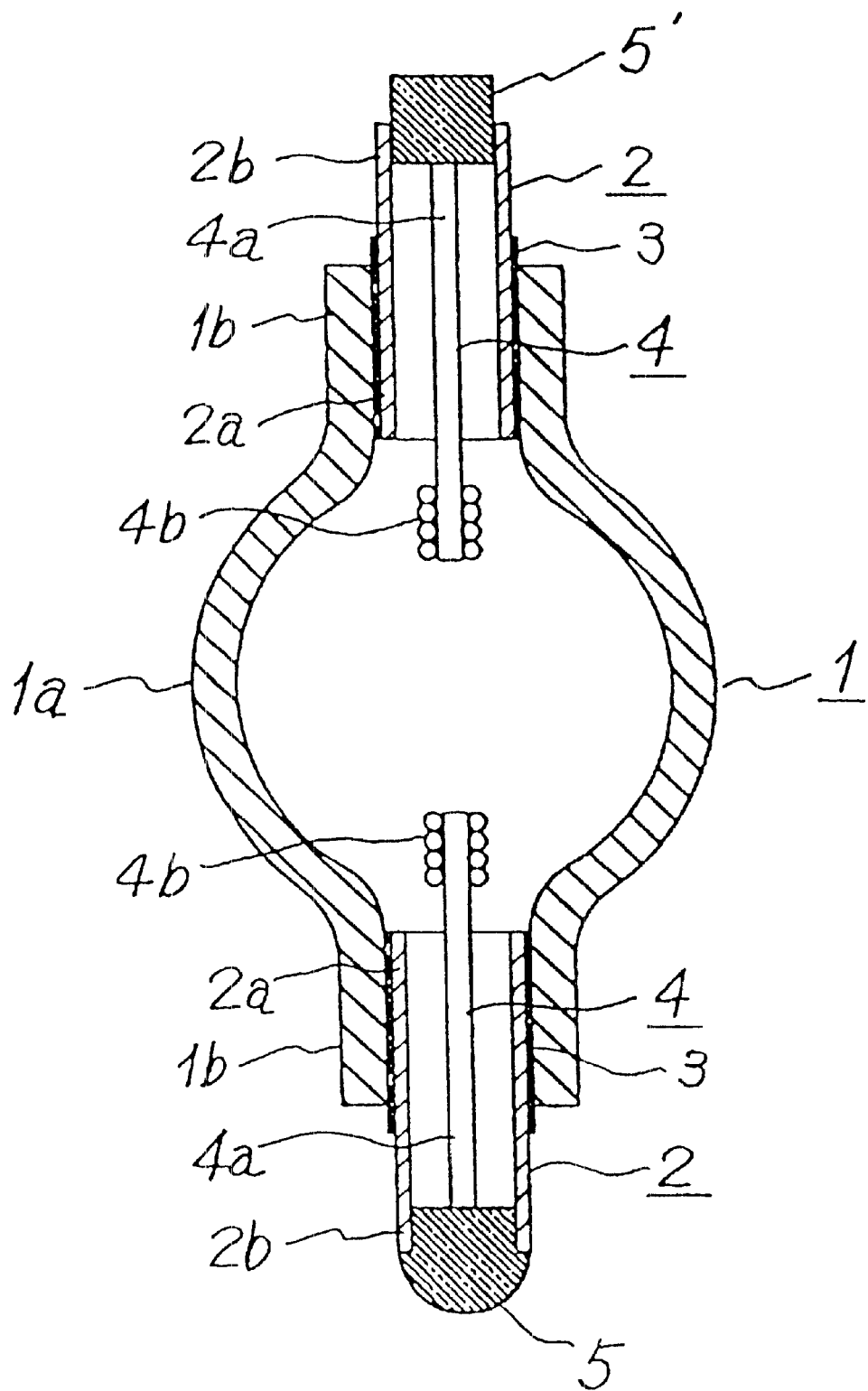
FIG. 2 is a front section front view of the high pressure discharge lamp showing a manufacturing process of it.

FIG. 1 is a front sectional view showing the first embodiment of the high pressure discharge lamp according to the present invention;

FIG. 2 is a front sectional view showing the high pressure discharge lamp in course of manufacturing the high pressure discharge lamp;

In the drawings, the high pressure discharge lamp is comprised of a light-transmissive ceramic discharge vessel 1, a metal pipe 2, a sealing layer 3, a pair of electrodes 4, 4, a fusing metal 5, and a discharge agent (not shown in drawings).

Light-Transmissive Ceramic Discharge Vessel 1

The light-transmissive ceramic discharge vessel 1 is made of a light-transmissive alumina ceramics, and is provided with an enclosure 1a and a pair of relatively short small-diameter portions 1b, 1b. The enclosure 1a has an almost spherical shape. The small-diameter cylinder 1b is coupled to the enclosure 1a by a smooth curved surface so as to integrally form the light-transmissive ceramic discharge vessel 1.

Metal Pipe 2

The metal pipe 2 has openings on its both ends, and communicates at its top end 2a with the interior of the light-transmissive ceramic discharge vessel 1 by being inserted into the thin cylindrical portion 1b. The metal pipe 2 is also fused to the inner wall of the thin cylindrical portion 1b by a sealing layer as described later. Thus the metal pipe 2 closes the light-transmissive discharge vessel 1.

Further, the outside of the metal pipe 2 is sealed by a fusing metal 5 mentioned below and exposed outside the light-transmissive discharge vessel 1.

Sealing Layer 3

The sealing layer 3 is interposed between the outer surface of the metal pipe 2 and the thin cylindrical portion 1b of the light-transmissive ceramic discharge vessel 1 in order to seal the gap between them, and it is made by principally a cermet. subject.

Electrodes 4, 4

The electrodes 4, 4 are each provided with an electrode base-rod 4a and an electrode principal portion 4b. The electrode base-rod 4a is shaped like a rod. The electrode principal portion 4b is shaped by winding a thin tungsten coil around the tip end of the electrode base-rod 4a. Further, the base end of the pair of electrodes 4, 4 is coupled to the metal pipe 2 via a fusing metal as described below, the mid-portion of them extends apart from the inner surface of the metal pipe 2 along the metal pipe 2, and the top end of them protrudes into the enclosure 1a of the light-transmissive ceramic discharge vessel 1.

Fusing Metal 5

The fusing metal 5 seals the metal pipe 2 by fusing the base end of the metal pipe 2. Further, the pair of electrodes 4, 4 are each supported in a prescribed position by being its base end buried in the fusing metal. That is, a fusing metal bead 5' wherein the base end 5 of the electrode 4 is coupled by buried is prepared beforehand. Subsequently, the light-transmissive ceramic discharge vessel 1 whereto the metal pipe 2 is sealed is set perpendicularly so that the opening of the metal pipe 2 will turn up. Then, the electrode 4 is inserted from the outside opened end of the metal pipe 2, the fusing metal bead 5' is placed on the opened end of the metal pipe 2, and the fusing metal bead 5' is irradiated with the YAG laser beam for a short time. Therefore, the perimeter of the fusing metal bead 5' is melted, and it fuses to the opened end of the metal pipe 2 so as to seal there.

Discharge Agent

In this embodiment, the discharge agent is comprised of luminous metal halide, mercury and rare gas, and filled in the light-transmissive ceramic discharge vessel 1. The lamp voltage formation agent is primarily comprised of mercury or halogen, the halogen being filled at a relatively high vapor pressure. The rare gas is used for a following is a starting gas and/or an agent for forming a luminous flux in the early stages of lighting.

Sample 1:

Light-transmissive ceramic discharge vessel 1: Maximum outer diameter D1 of the enclosure=6 mm; Wall thickness=0.5 mm; Overall length=10 mm; Outer diameter of the small-diameter cylinder 1b=2.7 mm.

Metal pipe 2: Made of molybden (Melting point T1; 2620° C.); Protruding length L2 of the base end=2.5 mm; Overall cross-sectional area of the metal pipe $2=0.785$ mm$^2$.

Sealing layer 3: Comprised primarily of cermet made by sintering molybdenium particles and alumina ceramics particles; Made porous; and, Impregnated with frit glasses in pores of the cermet.

Electrodes 4, 4: Made of tungsten; Outer diameter D4=0.2 mm; Overall length L3=4 mm; Coil of the electrode principal portion has four turns of 0.15 mm thickness tungsten wire; Electrode distance=3 mm.

Fusing metal 5: Made of platinum (melting point of 1770° C.); Axial length L4=2.5 mm Discharge agent: Comprised of luminous metal halide composed of NaI3/TlI/DyI3=70/10/20 (mass ratio); Mercury=0.21 mg; Rare gas=Ne—Ar 3% mixture at about 26.7 Pa.

Lamp dimensions: Overall length L1=15 mm; L1/D1=2.5; D2/D3=2.7

Lamp characteristics: Lamp voltage=75 V; Lamp current=0.25 A; Lamp power=20 W; Bulb wall load=28 W.

Here, the lamp characteristics was measured under a condition that the lamp is encapsulated in an outer bulb made of 12 mm length alumina silicate glass.

Sample 2:

Light-transmissive ceramic discharge vessel 1: Same as that of Sample 1.

Metal pipe 2: Same as that of Sample 1.

Sealing layer 3: Same as that of Sample 1.

Electrodes 4, 4: Same as that of Sample 1.

Fusing metal 5: Same as that of Sample 1.

Discharge agent: Comprised of luminous metal halide composed of NaI3/TlI/DyI3=70/10/20 (mass ratio); ZnI2=0.4 mg; Rare gas=Xe at about 100 kPa.

Lamp dimensions: Same as that of Sample 1.

Lamp characteristics: Lamp voltage=40 V; Lamp current=0.52 A; Lamp power=20 W; Lamp efficiency=70 lm/W. The present embodiment is a so-called mercury-free metal halide. Its lamp characteristic was measured under operating conditions of the high pressure discharge lamp which was encapsulated in an outer bulb made of 12 mm length alumina silicate glass.

Further, in a horizontal lighting of the high pressure discharge lamp, the outer surface of the upper middle part of the enclosure of the light-transmissive ceramic discharge vessel becomes the highest temperature portion of 1200 degree, and outer surface of the fusing metal becomes the lowest temperature portion of 900 degree. Therefore, the temperature difference is 300 degree.

Now, a table 1 below shows the result of the luminous efficiency measured by varying the overall length L1 of the high pressure discharge lamp and the maximum diameter D1 of its enclosure, and the color temperature measured by varying the lighting direction from the horizontal lighting to the downward (the upper portion of a screw-base) lighting.

TABLE 1

| Sample | L1/D1 | L1 (mm) | D1 (mm) | luminous efficiency (lm/W) | color temperature difference (K) |
|---|---|---|---|---|---|
|  | 1.0 | 15 | 15 | 32 | −560 |
| 2 | 1.5 | 15 | 10 | 65 | −150 |
| 3 | 2.5 | 15 | 6 | 78 | −80 |
| 4 | 3.0 | 15 | 5 | 81 | −70 |
| 5 | 3.5 | 15 | 4.3 | 80 | −80 |
| 6 | 4.0 | 15 | 3.8 | 78 | −120 |
| 7 | 4.5 | 15 | 3.3 | 62 | −150 |
| 8 | 5.0 | 15 | 3.0 | 55 | −300 |

In the Sample 1 in a table 1, the discharge agent is coagulated at the bottom of the enclosure of the light-transmissive ceramic discharge vessel during the horizontal lighting.

As seen from the table 1, when the ratio L1/D1 is in a range of 1.5 to 4.5, the luminous efficiency is high, and there is less change in the color temperature when varying the lighting direction.

A table 2 below shows the result of the luminous efficiency measured by varying the length L2 of the metal pipe which is exposed.

Table 2

| Sample | L2 (mm) | temperature difference (° C.) | hottest portion temperature (° C.) | lowest temperature portion (° C.) | luminous efficiency (lm/W) |
|---|---|---|---|---|---|
| 1 | 2.5 | 300 | 1200 | 900 | 65 |
| 2 | 5.0 | 490 | 1200 | 710 | 54 |
| 3 | 7.0 | 550 | 1200 | 650 | 46 |

As the Samples 2, 3 in the table 2, when the temperature difference is large, the luminous efficiency lowers.

Further, a table below 3 shows the result of the glow-arc transition time (transition time) which is measured by varying the diameter D4 of the electrode (electrode diameter) and the length L3 of it (electrode length), and the blackening which is measured after lighting the lamp 100 times. Here, the blackening is evaluated by it appearance. Further, the transition time is data that is achieved at the time of starting and lighting the lamp in the lighting circuit which is constituted by principally a compact high frequency inverter.

TABLE 3

| Sample | electrode diameter (mm) | electrode length (mm) | transition time (sec.) | blackening |
|---|---|---|---|---|
| 1 | 0.2 | 4 | 2.5 | virtually none |
| 2 | 0.3 | 3 | 2.8 | virtually none |
| 3 | 0.4 | 3 | 4.8 | strong |
| 4 | 0.2 | 2 | 2.6 | strong |

In a table 3, Sample 4 show a short glow transition time since the thermal capacity of the electrode is smaller than that of the Sample 1, but it shows the remarkable blackening for no obvious reason. However, the Samples 1, 2 show excellent results.

Furthermore, a table 4 shows results for testing the blinking in a following way on the high pressure discharge lamp according to the present invention and on the comparative example by using the lighting circuit having the crest value of the starting voltage is more than 15 kVp-p. That is, the high pressure discharge lamp according to the present invention is almost identical with the embodiment shown in FIG. 1, but it has a rated power consumption of 25 W. On the other hand, in the comparative example, the light-transmissive ceramic discharge vessel has the enclosure of the same maximum diameter 6 mm as that of the present invention, the inside diameter of the thin cylindrical portion of 0.8 mm, and an overall length of 15 mm. Its feed-conductor is made of niobium and has a diameter of 0.65. The ceramic sealing compound is $SiO_2$—$Al_2O_3$—$Dy_2O_3$ type.

The blinking is comprised of 10 seconds of lighting and 5 seconds of extinction with inrush current of 1.8 A.

Here in table 4, ○ represents excellent condition, and X represents failure.

TABLE 4

| Sample | starting voltage (kV) | present invention's example | comparative example |
|---|---|---|---|
| 1 | 10 | ○ | ○ |
| 2 | 15 | ○ | ○ |
| 3 | 20 | ○ | X |
| 4 | 25 | ○ | X |
| 5 | 30 | ○ | X |

As seen from the table 4, the present invention has no problem at the rapid re-lighting.

Referring now to FIGS. 3 through 8, other embodiments of the present invention will be described. In these drawings, the same elements as those, as shown in FIG. 1, are assigned with the like reference numerals and not discussed herein.

Figure 3:
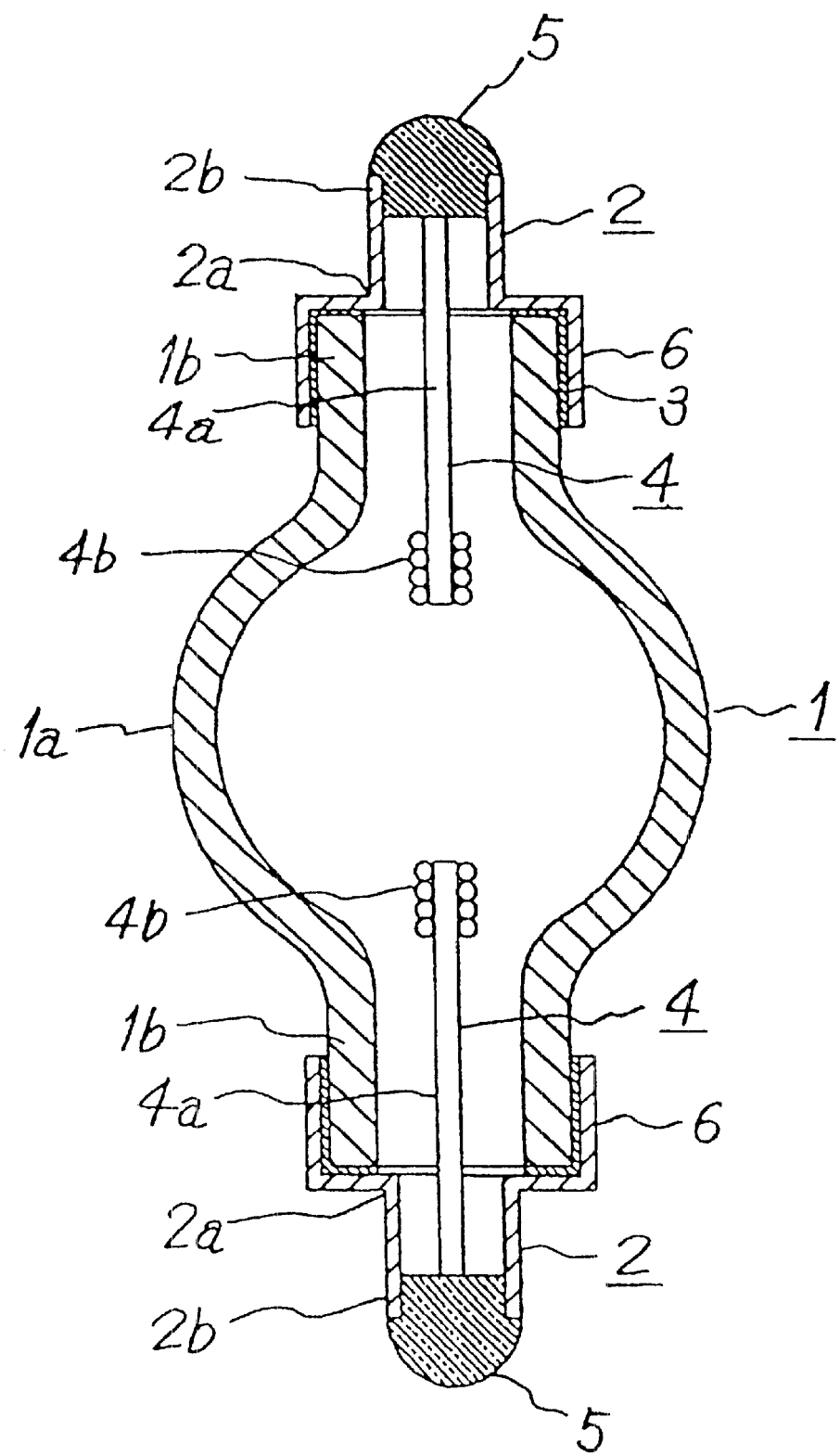
FIG. 3 is a front sectional view showing second embodiment of the high pressure discharge lamp according to the present invention.

FIG. 3 is a front sectional view of the high pressure discharge lamp of the second embodiment of the present invention.

In this embodiment, the metal pipe 2 has a refractory metal lid 2c which is formed in integral with the metal pipe 2. The refractory metal lid 2c has a skirt 2c1 which is also formed in integral with the refractory metal lid 2c. Therefore, the metal pipe 2 closes the end of the light-transmissive ceramic discharge vessel 1 by that the refractory metal lid 2c makes the skirt 2c1 fit outside the end of the small cylinder portion 2b of the light-transmissive ceramic discharge vessel 1, and by sealing with the sealing layer 3.

Figure 4:
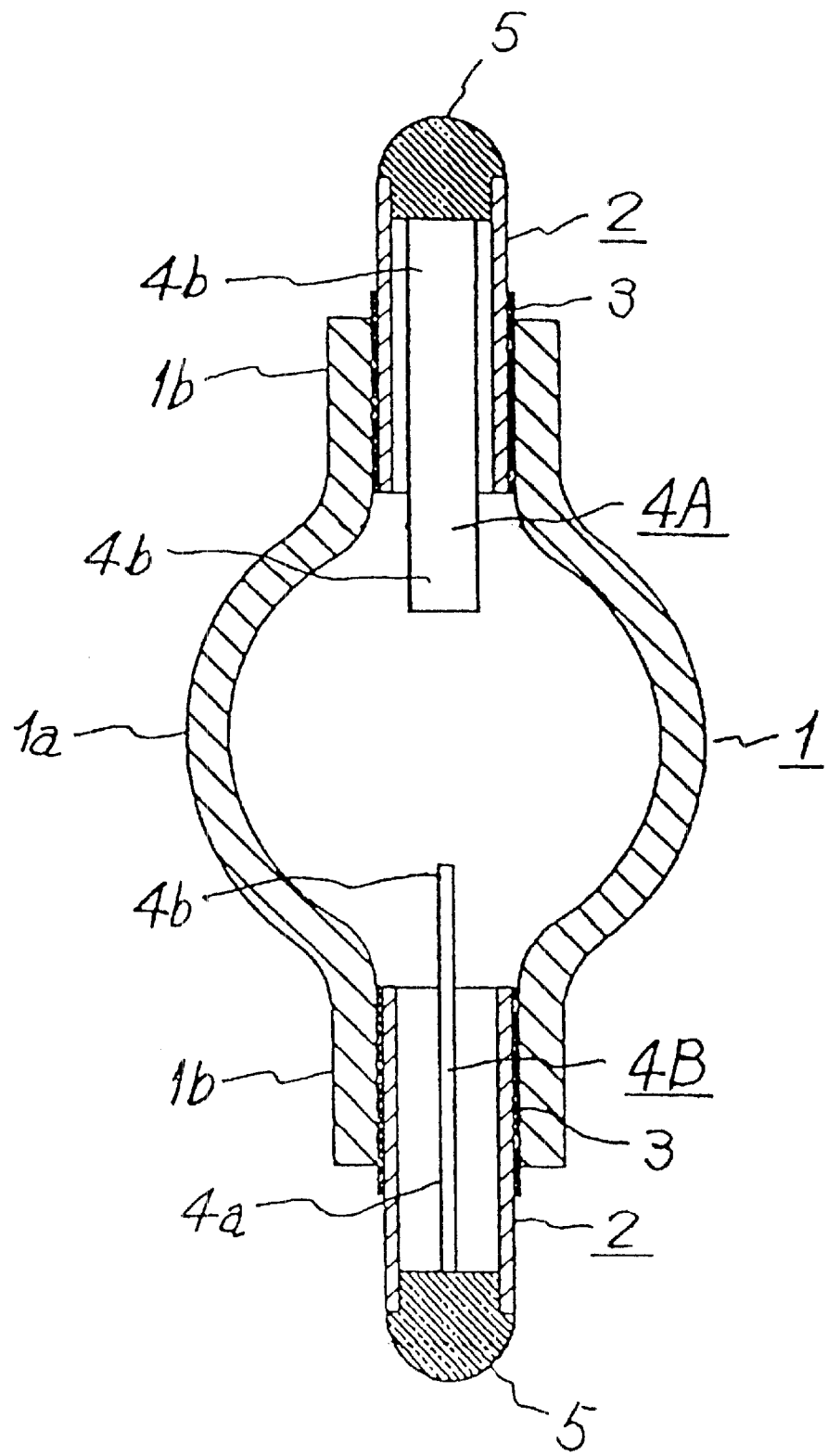
FIG. 4 is a front view of the third embodiment of the high pressure discharge lamp according to the present invention.

FIG. 4 is a front sectional view showing the third embodiment of the high pressure discharge lamp according to the present invention.

In the embodiment, the pair of electrodes 4A and 4B are asymmetrical.

That is, the electrode 4A is shaped like a rod having a diameter of 0.6 mm, and it is used as an anode in a DC lighting.

On the other hand, the electrode 4B is shaped like a rod having a diameter of 0.15 mm, and it is used as a cathode.

Figure 5:
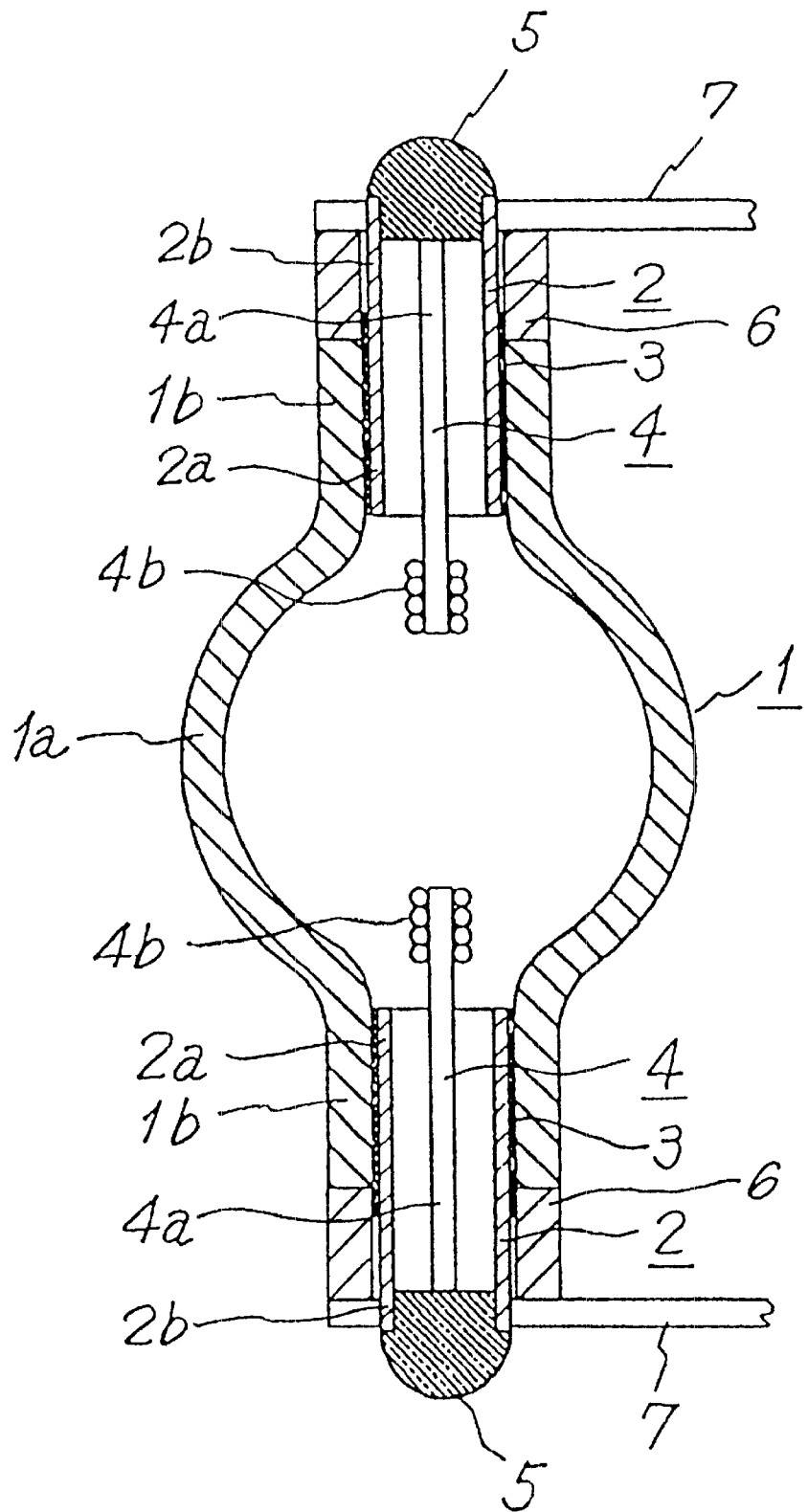
FIG. 5 is a partial section front view showing the fourth embodiment of the high pressure discharge lamp according to the present invention
Figure 6:
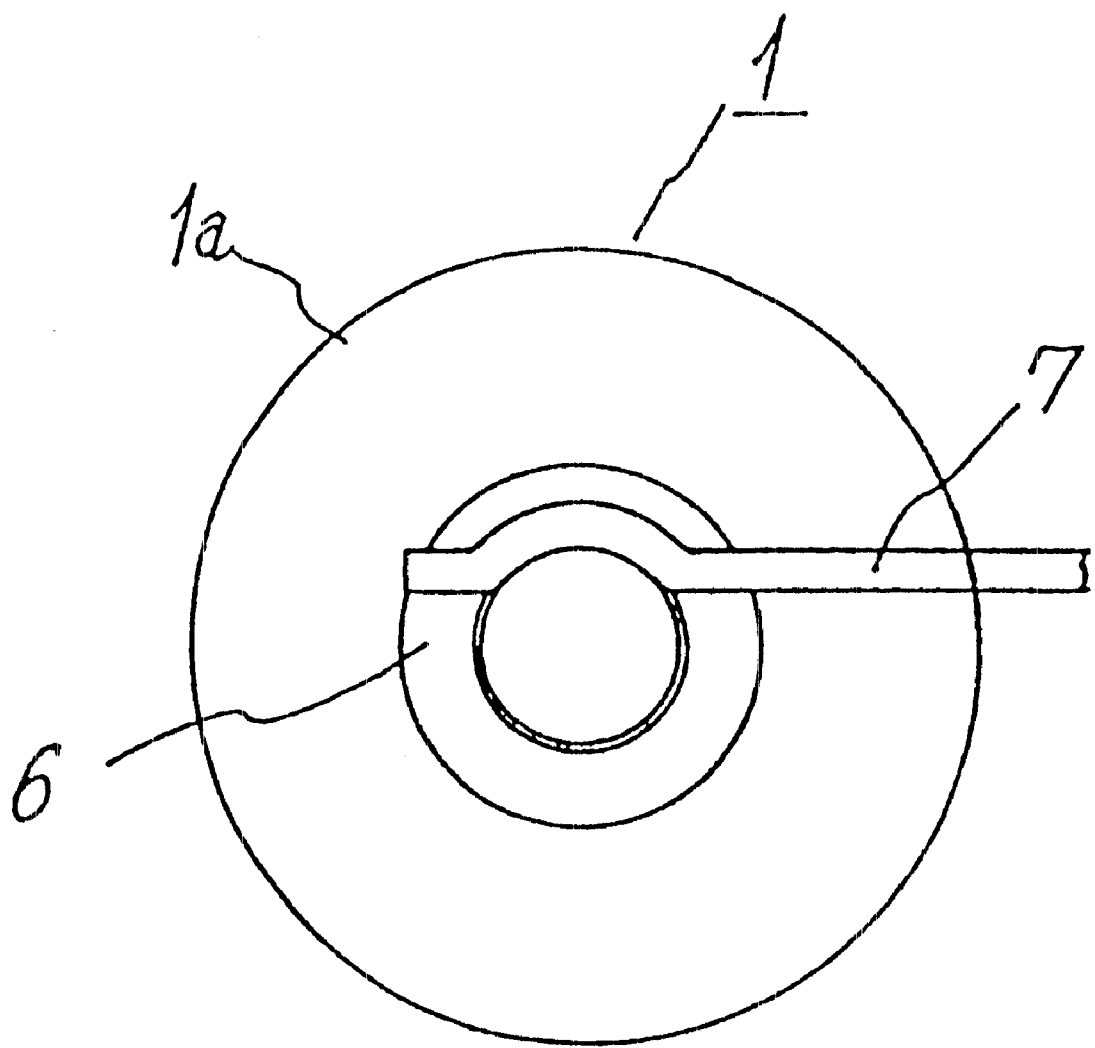
FIG. 6 is a partial section a plan view showing the fourth embodiment of the high pressure discharge lamp according to the present invention.

Referring now to FIGS. 5 and 6, a fourth embodiment of the high pressure discharge lamp according to the present invention will be described. FIG. 5 shows a partial section front view of the embodiment. FIG. 6 is a partial section plan view of the embodiment. This embodiment is provided with a heat insulator 6 and a feeder lead 7. That is, the heat insulator 6 has a cylinder shape made of alumina ceramics, and loosely fits outside the portion of the metal pipe 2 which is exposed outside the small cylinder portion 1b of the light-transmissive ceramic discharge vessel 1. The feeder lead 7 is made of tantalum, and welded with its top end to the base end of the metal pipe. Here, the cross-sectional area of the feeder lead 7 is made narrower than the overall cross-sectional area of the metal pipe.

Figure 7:
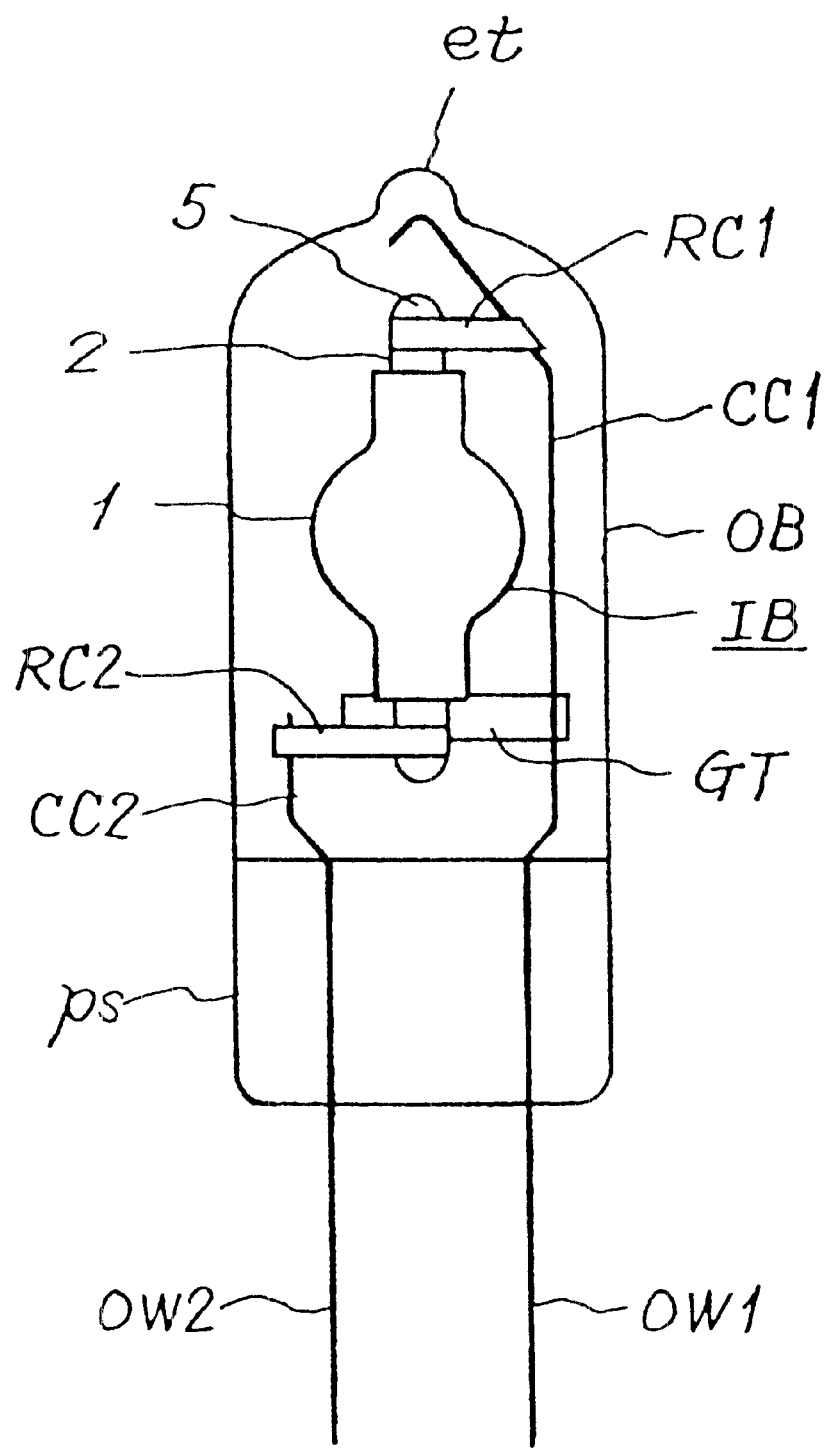
FIG. 7 is a front view showing the fifth embodiment of the high pressure discharge lamp according to the present invention.

FIG. 7 is a sectional view showing the fifth embodiment of the high pressure discharge lamp according to the present invention.

In this embodiment, the light-intensity discharge lamp is provided with a jacket-bulb OB as an incidental configuration. That is, the high pressure discharge lamp of this embodiment is comprised of an arc tube IB, the first and the second feeder leads RC1, RC2, the first and the second coupling conductors CC1, CC2, a getter GT, a jacket bulb OB, and the first and the second outer lead wires OW1, OW2.

Arc Tube IB

The arc tube IB has a same configuration as the high pressure discharge lamp as shown in FIG. 1, but it is called a arc tube because it is accommodated in the jacket bulb OB.

Feeder leads RC1, RC2

The first and second feeder leads RC1, RC2 are conductors made of tantalum and shaped in ribbons with 2 mm wide, 0.1 mm thickness and 0.2 mm$^2$ cross-section. One end of the first feeder lead RC1 is welded to the upper metal pipe 2, as shown in FIG. 4. One end of the second feeder lead RC2 is welded to the lower metal pipe 2, as shown in FIG. 4.

Coupling Conductors CC1, CC2

The fist coupling conductor CC1 is made of a 0.3 mm thickness molybdenum wire, the top end of it is engaged to an evacuation pinch-off portion et on the top of the jacket bulb OB as described below, and its mid-portion is welded to the other end of the first feeder lead RC1. The second coupling conductor CC2 is made of the molybdenum, and the top end of it is welded to the other end of the second feeder lead RC2.

So, the arc tube IB is supported by the first and the second feeder leads RC1, RC2, and the first and the second coupling conductors CC1, CC2.

Getter GT

The getter GT is made of ZrAl alloy, and it is supported by the first coupling conductor CC1 by welding.

Jacket-bulb OB

The jacket-bulb OB is made of a T-shaped hard glass bulb which consists of an alumina silicate glass. A pinch-sealed portion ps is formed at the base end of the jacket-bulb OB, and an evacuation pinch-off portion et is formed at the top end of the jacket-bulb OB. The interior of the jacket-bulb is in the lower evacuated condition around $10^{-2}$ Pa. The pinch-sealed portion ps is formed by pinching the opening of the T-shaped bulb when the opening is softened by the heating. The evacuation pinch-off portion t is a trace which had been left after evacuating the jacket-bulb OB through an exhaust pipe and pinching-off the pipe.

Outer Lead Wires OW1, OW2

The first and the second outer lead wires OW1 and OW2 are comprised by that the first and the second coupling conductors CC1, CC2 which are hermetically led outside the pinch-sealed portion ps of the jacket bulb OB.

Lamp Dimensions

Jacket bulb OB: Overall length=36 mm; Outer diameter= 12 mm.

Distance from the luminous center to respective inner ends of the exhaust pinch-off portion et and pinch sealing portion ps=13 mm.

Figure 8:
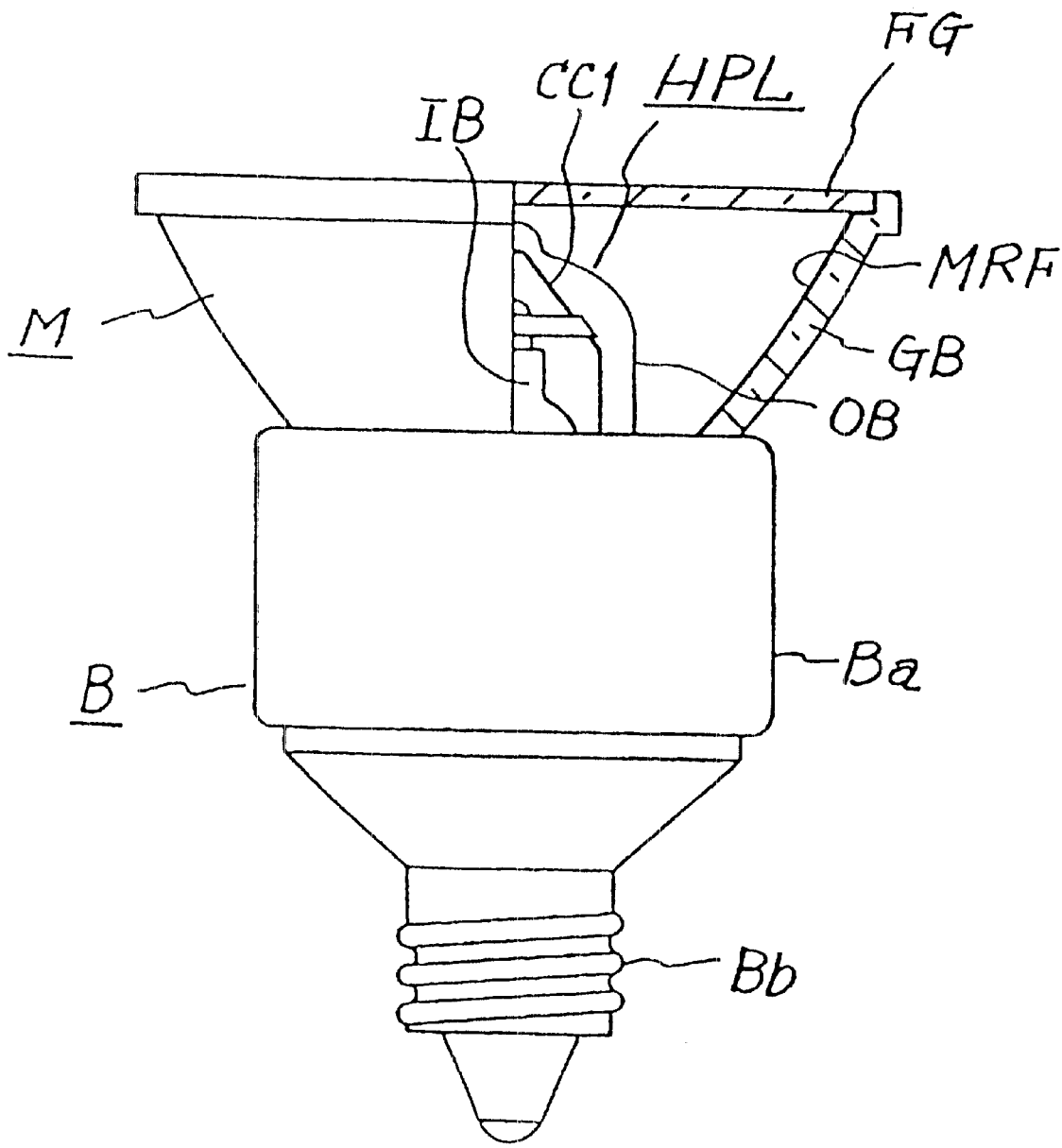
FIG. 8 is a partial section front view showing the sixth embodiment of the high pressure discharge lamp according to the present invention.

FIG. 8 is a partial section front view showing the sixth embodiment of the high pressure discharge lamp according to the present invention. The embodiment is characterized by a reflector M and a screw-base B are merged to the high pressure discharge lamp HPL which is provided with a jacket bulb OB. That is, the reflector M, whose opening has a diameter of 35 mm, is comprised of a base body GB, a reflecting film MRF, and a front cover FG. The base body GB is formed in a bowl shape by glass. The reflecting film MRF is formed on inside surface of the base body GB by a dichroic mirror which is made of a multi-layered interference film. The front cover FG if made of a flat transparent glass plate, and placed on the front surface of the base body GB.

The screw-base is an EZ10 type screw-base, and it is provided with a supporting base body Ba and a screw-base shell Bb. The supporting base body Ba is the porcelain. A cylindrical portion (not shown) projecting from the top of the base body GB of the reflector M fits into inside of the supporting base body Ba, and they are fixed by the inorganic adhesive. The screw-base shell Bb is fixed to the bottom end of the supporting base body Ba by swaging it. The outer lead wires OR1 and OR2 are coupled to the center contact of the screw-base shell Bb and the screw-base shell also.

In the high pressure discharge lamp HPL, the axial center of the enclosure 1a of the light-transmissive ceramic discharge vessel 1 is positioned on the focal point of the reflector M.

And, the high pressure discharge lamp HPL has a luminous center distance of 35 mm, and an overall length of 50 mm.

Figure 9:
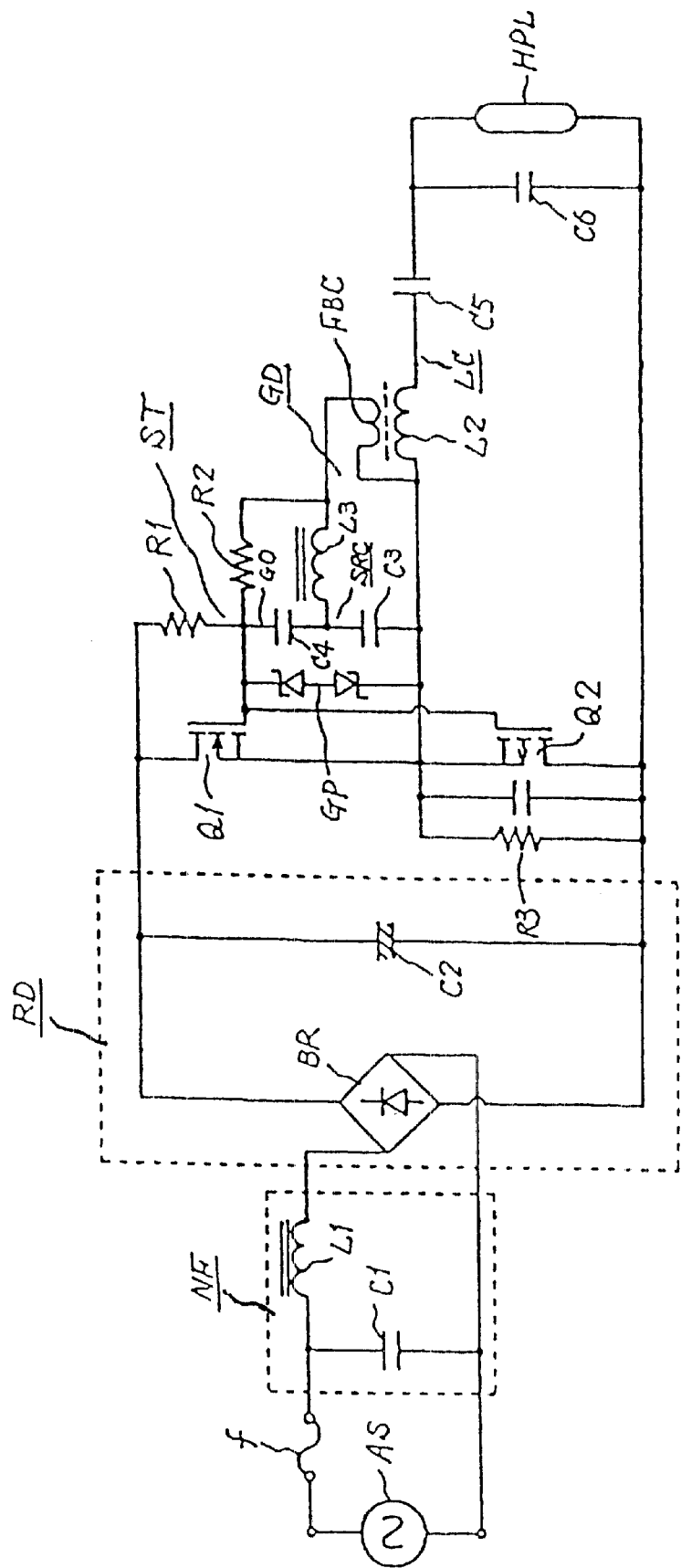
FIG. 9 is a circuit diagram showing a first embodiment of the lighting apparatus for lighting the high pressure discharge lamp according to the present invention.
Figure 10:
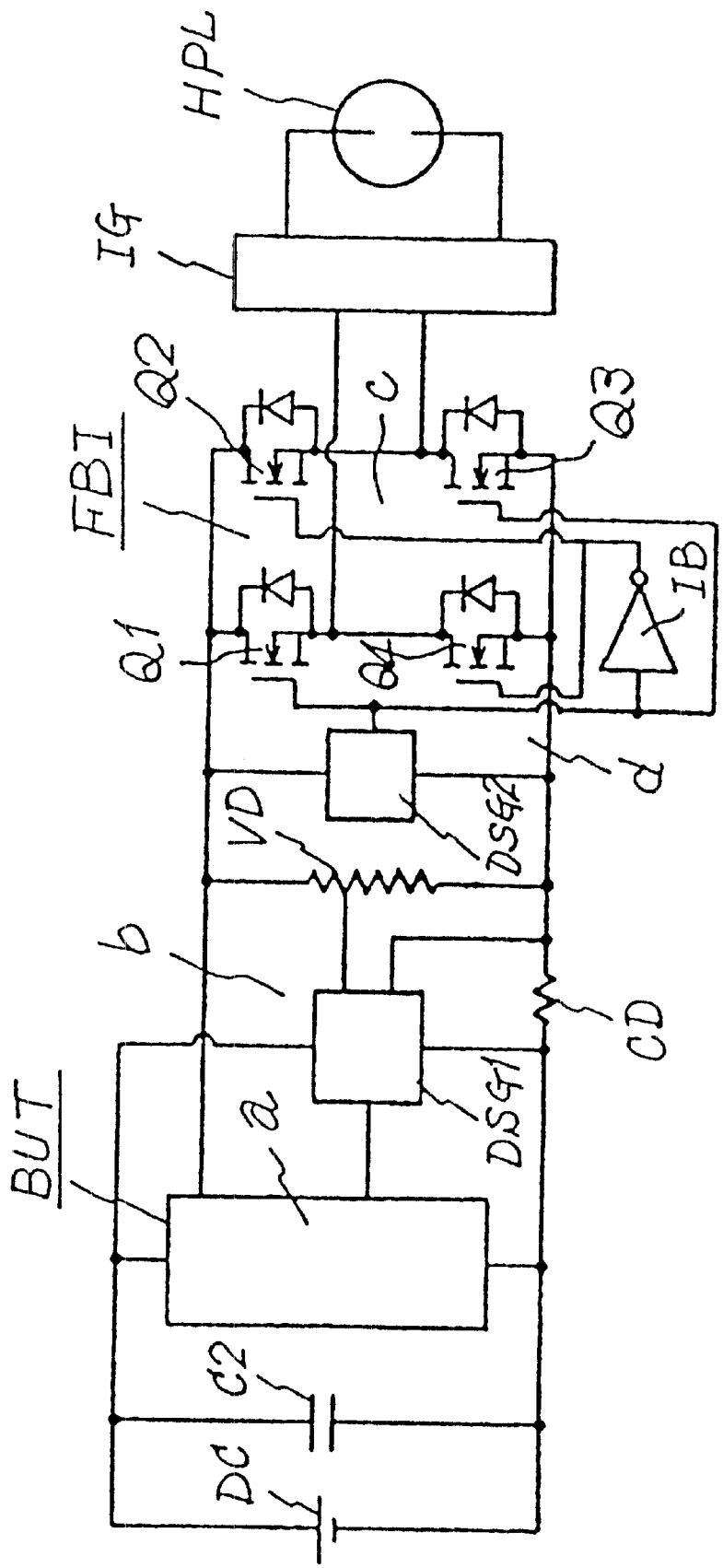
FIG. 10 is a circuit diagram showing a second embodiment of the lighting apparatus for lighting the high pressure discharge lamp according to the present invention.
Figure 11:
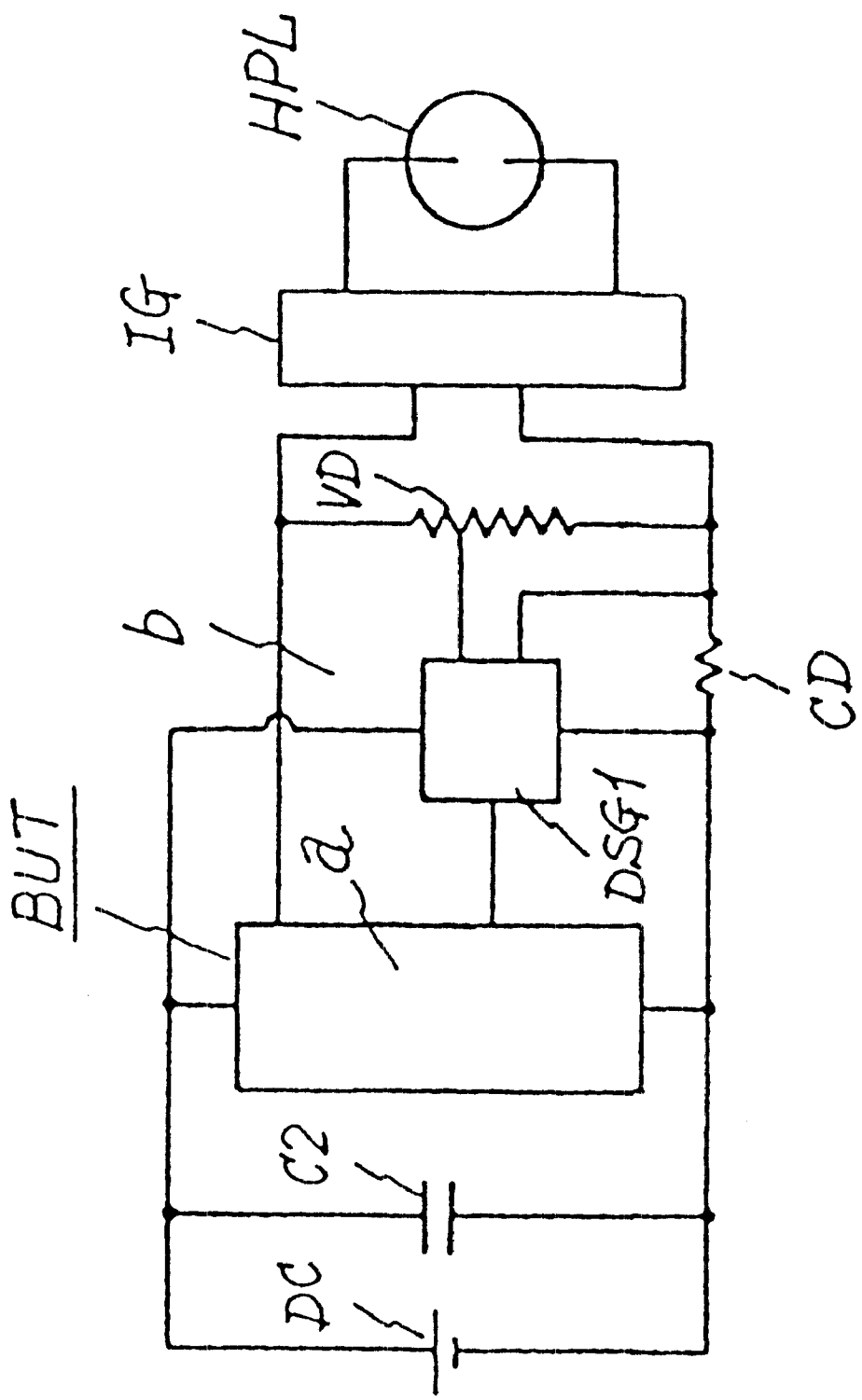
FIG. 11 is a circuit diagram showing a third embodiment of the lighting apparatus for lighting the high pressure discharge lamp according to the present invention.

Referring now to FIGS. 9 to 11, a first through third embodiments of the high pressure discharge lamp lighting apparatus according to the present invention will be described.

FIG. 9 is a circuit diagram showing a first embodiment of the lighting apparatus of the high pressure discharge lamp according to the present invention. In this embodiment, the lighting apparatus adopts a high frequency lighting system. That is, a lighting apparatus similar to a lighting apparatus for a fluorescent lamp which is primarily constituted by a half bridge type high frequency inverter. In FIG. 9, AS denotes a AC power source, f denotes an overcurrent fuse, NF denotes a noise filter, RD denotes a rectified DC power source, HFI denotes a high frequency inverter, and LC denotes a load circuit. The above components will be respectively explained hereinafter.

The AC power source AS means a commercial 100 V power source.

The overcurrent fuse f is a pattern-fuse printed on a printed circuit board. The fuse f protects the circuit from its burn-out when an excessive current has flown through the circuit.

The noise filter NF is comprised of an inductor L1 and a capacitor C1, and eliminates high frequency components occurring with the operation of the high frequency inverter from their incurrent to the power supply side.

The rectified DC power source RD is comprised of a bridge rectifier circuit BR and a smoothing capacitor C2. AC input terminals of the bridge rectifier circuit BR are coupled to the AC power source A via the noise filter NF and the overcurrent fuse f. DC output terminals thereof are coupled across a smoothing capacitor C2 and output a smoothed DC current.

The high frequency inverter HFI is comprised of a half bridge inverter, and it is provided with a first and a second switching elements Q1, Q2, a gate drive circuit GD, a starting circuit ST, and a gate protection circuit GP.

The first switching element Q1 is comprised of an N-channel MOSFET whose drain is connected to a positive polarity terminal of the smoothing capacitor C2. The second switching element Q2 is comprised of a P-channel MOSFET whose source is connected to the source of the first switching device Q1, while whose drain is connected to a negative polarity terminal of the smoothing capacitor C2. Accordingly, the first and the second switching elements Q1 and Q2 are connected in series in order, and their respective polarity terminals are connected across the output terminals the rectified DC power source RD.

The gate drive circuit GD is comprised of a feedback circuit FBC, a series resonator SRC, and a gate voltage output circuit GO. The feedback circuit FBC is comprised of an auxiliary winding which is magnetically coupled to a current limiting inductor L2. The series resonator SRC is comprised of a series circuit of an inductor L3 and a capacitor C3 which is connected across the feedback circuit FBC. The gate voltage output circuit GO is constituted for outputting a resonance voltage appearing across the capacitor C3 of the series resonant circuit SRC via a capacitor C4. Then, one end of the capacitor C4 is coupled to the connection node of the capacitor C3 and the inductor L3, while the other end of the capacitor C4 is coupled to the gates of the first and the second switching elements Q1 and Q2. Further, the other end of the capacitor C3 is coupled to the sources of the first and the second switching elements Q1 and Q2. Accordingly, the resonance voltage appearing across the capacitor C3 is applied across the gates and the sources of the first and the second switching elements Q1 and Q2 via the gate voltage output circuit GO.

The starting circuit ST is comprised of resistors R1, R2 and R3. One end of the resistor R1 is connected to the positive polarity terminal of the smoothing capacitor C2 and the other end thereof is connected to the gate of the first switching element Q1. The other end of the resistor R2 is connected to the one end of the resistor R2, the output terminal of the gate voltage output circuit GO of the gate drive circuit GD and the other end of the capacitor C4. The other end of the resistor R2 is connected to the connection node of the inductor L3 of the series resonator SRC and the feedback circuit FBC. One end of the resistor R3 is connected to both of the first and the second switching devices Q1 and Q2, i.e., the sources of the switching devices Q1 and Q2 and the source of the gate voltage output circuit GO. While the other end of the resistor R3 is connected to the negative polarity terminal of the smoothing capacitor C2.

The gate protection circuit GP is comprised of a pair of Zener diodes connected in series and their opposite terminals connected each other, and is connected in parallel to a gate voltage output circuit GO.

The load circuit LC is comprised of a series circuit of the high pressure discharge lamp HPL, the current limiting inductor L2 and a DC-blocking capacitor C5, and a resonance capacitor C6 which is connected in parallel to the high pressure discharge lamp HPL. One end of the load circuit LC is connected to the connection node of the first and the second switching elements Q1 and Q2, and the other end is connected to the drain of the second switching element Q2. The high pressure discharge lamp HPL has a configuration as shown in FIG. 1. The current limiting inductor L2 and the resonance capacitor C6 form together a series resonator. Here, the DC-blocking capacitor C5 has a large capacitance, and thus does not significantly affect to the series resonance.

A capacitor C7 connected across the drain and the sources of the second switching element Q2 reduces a load during the switching operation of the second switching device Q2.

The operation frequency of the high frequency inverter HFI is 150 kHz. The high pressure discharge lamp HPL starts operation and lights the lamp without any acoustic resonance.

FIG. 10 is a circuit diagram showing the second embodiment of the high pressure discharge lamp according to the present invention. In this embodiment, a low frequency AC lighting circuit is adopted. In FIG. 10, the same elements as those, as shown in FIG. 9, are assigned with the like reference numerals and not discussed herein. In FIG. 10, DC denotes a DC power source, BUT denotes a voltage-boosting chopper, FBI denotes a full-bridge type inverter, IG denotes an igniter.

The DC power source DC is, for example, a car buttery.

The voltage-boosting chopper is comprised of a main section a and a control section b, and its input terminal is connected to the DC power source DC through a smoothing capacitor C2. The main section a is comprised of a series circuit of an inductor and a switching element coupled across the DC power source DC and another series circuit of diode and a smoothing capacitor coupled in parallel with the switching element. Then, a boosted DC voltage is applied across the smoothing capacitor.

The control section b is comprised of an output voltage detector VD, an output current detector CD and a drive signal generator DSG1. The output voltage detector VD detects an output voltage corresponding to the lamp voltage of the high pressure discharge lamp HPL, and controls the drive signal generator DSG1. The output current detector CD detects an output current corresponding to the lamp current of the high pressure discharge lamp HPL, and controls the drive signal generator DSG1. As a result, a drive signal generated from the drive signal generator DSG1 is controlled in a PWM manner so as to stabilize the lamp power supplied to the high pressure discharge lamp HPL, and then controls the ON-OFF timings of the switching elements.

The full-bridge type inverter FBI is comprised of a main section c and a control section d, and its input terminal is connected to the output terminal of the voltage boosting chopper BUT. The main section c is comprised of switching elements Q1–Q4, respectively assigned to the four arms of a bridge circuit. Here, the switching elements Q1–Q4 include MOSFETs. And diodes coupled across the MOSFETs with reversed polarities, respectively. The control section d is comprised of a drive signal generator DSG2 and an inverter IB. The inverter IB inverts phases of drive signals applied to the gates of the switching elements Q2 and Q4. As a result, the set of the switching elements Q1, Q3 and the other set of the switching elements Q2, Q4 are alternatively turn On and OFF. Then the high pressure discharge lamp HPL is supplied a rectangular wave low frequency AC voltage.

The igniter IG applies a start pulse to the high pressure discharge lamp HPL in receiving the low frequency AC voltage from the full-bridge type inverter FBI.

As a result, the high pressure discharge lamp HPL is lighted by an AC of low frequency. The control section b of the voltage boosting chopper has a built-in microcomputer which stores therein a time-sequential control pattern. According to the time-sequential control pattern, for instance, the voltage boosting chopper BUT supplies the high pressure discharge lamp HPL with a lamp current three or more times of the rated lamp current of the lamp just after the start of the lighting operation. After that the supplied lamp current is gradually reduced as time progresses. After a while the supplied lamp current reaches the rated lamp current. The control section b generates a constant power control signal by the detection signals of the lamp current and the lamp voltage being fed back to the drive signal generator DSG1 in the control section b. Then the voltage boosting chopper BUT controls the high pressure discharge lamp HPL with a constant lamp power. Here, the inductor L in the voltage boosting chopper BUT also operates as a current-limiting inductor for the high pressure discharge lamp HPL.

FIG. 11 is a circuit diagram showing a third embodiment of the lighting apparatus of the high pressure discharge lamp according to the present invention. In this embodiment, the lighting apparatus adopts a DC lighting system. In FIG. 11, the same elements as those, as shown in FIG. 10, are assigned with the like reference numerals and not discussed herein. In FIG. 10, the high pressure discharge lamp HPL and the igniter IG are supplied with a DC output voltage of the voltage boosting chopper BUT which has the same construction as that in FIG. 10. Thus, the high pressure discharge lamp HPL is lighted with DC current.

Thus, just after the high pressure discharge lamp HPL has lighted with the DC current, a predetermined luminous flux are radiated. Accordingly, it is realized a luminous flux required for automobile headlight, i.e., a radiation of 25% luminous flux of the rated flux value at one second after a power supply start, and the a radiation of 80% luminous flux of the rated flux value at four seconds after the power supply start.

Furthermore, since the above embodiment of the lighting apparatus does not need a DC-AC converter, a cost in about 30% is reduced in comparison to an AC lighting system. Also a weight in about 15% is reduced in comparison to an AC lighting system. Accordingly it is able to reduce the cost of the lighting circuit.

Figure 12:
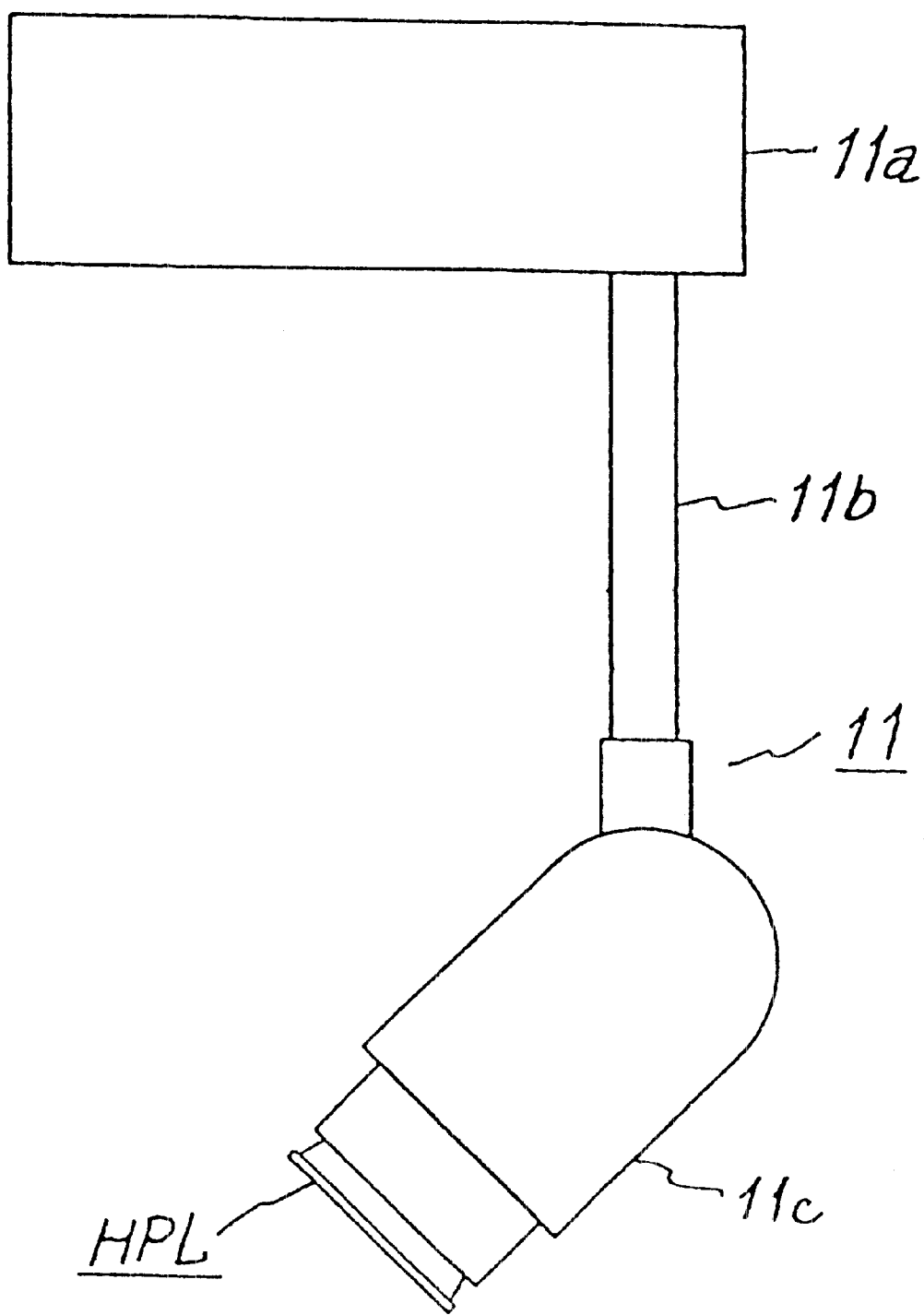
FIG. 12 is a front view showing a spotlight as an embodiment of the luminaire according to the present invention.

FIG. 12 is a front view showing a spotlight as an embodiment of the luminaire according to the present invention. In FIG. 12, the spotlight of the embodiment is comprised of a spotlight principal body 11 and a high pressure discharge lamp HPL provided with a reflector.

The spotlight principal body 11 is mainly provided with a lighting duct mounting portion 11a, an arm 11b, and a lighting body 11c. The lighting duct mounting portion 11a is mounted on a lighting duct (electrical supply track system for luminaire) (not shown) removably, and it hangs the spotlight. Further, it accommodates therein the lighting circuit (not shown) and receives the power from the lighting duct. The base end of the arm 11b is fixed to the lighting duct mounting portion 11a. The lighting body 11c has an opening at its front, and is pivoted on the free-end of the arm 11b in freely rockable in a vertical plane. Further, it accommodates therein a screw-in lamp socket (not shown).

The high pressure discharge lamp HPL has the same specifications as those as shown in FIG. 8.

According to the first aspect of the invention, the high pressure discharge lamp is provided with a light-transmissive ceramic discharge vessel with an envelope having a maximum outer diameter D1 and open ends; a metal pipe, whose opened top end communicates with the interior of the light-transmissive ceramic discharge vessel and is sealed thereto, and whose base end is exposed outside the light-transmissive ceramic discharge vessel and sealed, and a pair of electrodes, whose base end is coupled to the metal pipe, and whose top end protrudes into the enclosure. According to an overall length L1 of the lamp satisfying the following equation, not only the lamp is made smaller as a whole, but also the temperature of the lowest temperature portion can be set high.

$$1.5 \leq L1/D1 \leq 4.5$$

So that it is possible to achieve a high pressure discharge lamp which has not only a high luminous efficiency and a desired luminous color, but also little difference of the luminous color even though the lighting direction is changed since the temperature distortion of whole high pressure discharge lamp is considerably made uniform.

According to the second aspect of the invention, since the overall length is less than 30 mm, it is able to provide a high pressure discharge lamp which can achieve remarkable effects of defining the ratio L1/D1.

According to the third aspect of the invention, it is characterized by that the high pressure discharge lamp has a light-transmissive ceramic discharge vessel with an envelope and open ends, a metal pipe having one end, i.e., a top end fused in the open end of the light-transmissive ceramic discharge vessel and the other end, i.e., a base end protruding from the light-transmissive ceramic discharge vessel, a pair of electrodes each having one end, i.e., a base end connectively supported on the base end of the metal pipe and the other end, i.e., a top end extending within the light-transmissive ceramic discharge vessel, and a discharge agent which is filled in the light-transmissive ceramic discharge vessel. According to that the high pressure discharge lamp has an overall length less than 30 mm and a temperature difference of 400° C. between the highest temperature portion and the lowest temperature portion during operation, the lamp is able to not only achieve a high luminous efficiency and/or a desired luminous color, but also be caused less cracks on the light-transmissive ceramic discharge vessel.

According to the fourth aspect of the invention, the high pressure discharge lamp has a light-transmissive ceramic discharge vessel with an envelope and two open ends, a metal pipe made of a metal having a melting point of T1 whose top end fused in the open end of the light-transmissive ceramic discharge vessel and whose other end protruding from the light-transmissive ceramic discharge vessel, a fusing metal made of a metal having a melting point of T2 and sealing the base end of the metal pipe, a pair of electrodes each having one end, i.e., a base end connectively supported on the base end of the metal pipe via fusing metal and the other end, i.e., a top end extending within the light-transmissive ceramic discharge vessel, and a discharge agent which is filled in the light-transmissive ceramic discharge vessel.

According to that the melting point T1 of the metal pipe and the melting point T2 of the fusing metal satisfies a following equation, the high pressure discharge lamp is able to easily and securely perform to seal the metal pipe and to connect the electrodes, and be easily manufactured.

$$T1 > T2$$

Metal Pipe

According to the fifth aspect of the invention, it is characterized by that since the length L3 of the electrode and the length L4 of the fusing metal in the bulb axis direction satisfy a following equation, it is able to provide the high pressure discharge lamp wherein the undesirable dispersion of the electrode distance is reduced, and its life characteristic is hard to be lowered by the blackening.

$$L3 > L4$$

Metal Pipe

According to the sixth aspect of the invention, it is characterized by that the light-transmissive ceramic discharge vessel is provided with a thin cylindrical portion with an outer diameter D2 formed at the end of the enclosure, and the a metal pipe with an outer diameter D3 closes the ends of the light-transmissive ceramic discharge vessel by being inserted and fused its top end in a thin cylindrical portion of the light-transmissive ceramic discharge vessel. And then, due to the outer diameter D2 of the thin cylindrical portion and the metal pipe and the outer diameter D3 of the metal pipe satisfy a following equation, it is able to provide the high pressure discharge lamp which is hard to be caused cracks by thermal stresses on the thin cylindrical portion.

$$1.5 \leq D2/D3 \leq 4.0$$

According to the seventh aspect of the invention, it is characterized by that the electrode is comprised of an electrode base-rod having a diameter D4 of less than 0.3 mm and an electrode principal portion which is placed at the end of the electrode base-rod, and the overall length L3 of the electrode is equal to or longer than 4 mm. It is thus able to provide a high pressure discharge lamp wherein the thermal conduction quantity is reduced during the glow-arc discharge, so that the glow-arc transition time is hard to be extended.

According to the eighth aspect of the invention, it is characterized by that the length L2 of the metal pipe which is exposed outside the light-transmissive ceramic discharge vessel satisfies a following equation, it is able to provide the high pressure discharge lamp which prevents the decrease of the strength of the end portion of the light-transmissive ceramic discharge vessel caused by the thermal stress at the time of sealing the metal pipe.

$$1.0 \leq L2 \leq 4.0$$

According to the ninth aspect of the invention, it is characterized by that since the linear transmittance of the light-transmissive ceramic discharge vessel is 30% or more, it is able to provide the high pressure discharge lamp which is easy to condense the light since it aims at further a point-source of light.

According to the tenth aspect of the invention, it is characterized by that since one of the electrodes is a relatively thick rod, and the other electrode is a thin rod, it is able to provide a high pressure discharge lamp which is simple in structure while it is able to be lighted by DC current.

According to the eleventh aspect of the invention, it is characterized by that since it is provided with a feeder lead having a cross-sectional area narrower than the overall cross-sectional area of the metal pipe and lead out from the metal pipe, it is able to provide a high pressure discharge lamp which is able to relatively reduce a heat quantity transferred from the metal pipe to the feeder lead, and thus keeps the metal pipe in a desirable high temperature for achieving high luminous efficiency and a desired luminous color.

According to the twelfth aspect of the invention, it is characterized by that since it is provided with a heat insulator which covers the outer surface of the portion of the metal pipe exposed outside the end portion of the light-transmissive ceramic discharge vessel, it is able to provide a high pressure discharge lamp which is able to restrict a decreasing of temperature due to the heat dissipation from the metal pipe, and thus keeps the metal pipe in a desirable high temperature for achieving still favorable high luminous efficiency and a still desirable luminous color.

According to the thirteenth aspect of the invention, it is characterized by that since it is provided with the high pressure discharge lamp according to any one of the first to twelfth aspects of the invention and the lighting circuit having the crest value of the starting voltage of 15 kVp-p or more, it is able to provide the high pressure discharge lamp lighting device which has high resistance over the thermal and electric shocks such as starting or blinking of the high pressure discharge lamp.

According to the fourteenth aspect of the invention, it is able to provide the luminaire performing the effects according to any one of the first to twelfth aspects of the invention.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A high pressure discharge lamp, comprising:
   a light-transmissive ceramic discharge vessel with an envelope having a maximum outer diameter D1 and open ends;
   a metal pipe disposed in each of the open ends, respectively, each metal pipe having a first end located in a corresponding one of the open ends of the light-transmissive ceramic discharge vessel and a second end protruding from the light-transmissive ceramic discharge vessel;
   a plurality of electrodes each having a first end connected to a corresponding metal pipe and a second end extending within the light-transmissive ceramic discharge vessel; and
   a discharge agent which is filled in the light-transmissive ceramic discharge vessel, wherein the high pressure discharge lamp has an overall length L1, and the overall length L1 and the maximum outer diameter of D1 satisfy an equation:

$1.5 \leq L1/D1 \leq 4.5$.

2. The high pressure discharge lamp as claimed in claim 1, wherein the overall length L1 of the discharge lamp is less than 30 mm.

3. A high pressure discharge lamp, comprising:
   a light-transmissive ceramic discharge vessel with an envelope and open ends;
   a metal pipe disposed in each of the open ends, respectively, each metal pipe having a first end located in a corresponding one of the open ends of the light-transmissive ceramic discharge vessel and a second end protruding from the light-transmissive ceramic discharge vessel;
   a plurality of electrodes each having a first end connected to a corresponding metal pipe and a second end extending within the light-transmissive ceramic discharge vessel; and
   a discharge agent which is filled in the light-transmissive ceramic discharge vessel,
   wherein an overall length L1 of the discharge lamp is less than 30 mm, and a temperature difference between a highest temperature portion and a lowest temperature portion is less than 400 degrees Celsius during operation of the lamp.

4. A high pressure discharge lamp, comprising;
   a light-transmissive ceramic discharge vessel with an envelope and two open ends;
   a metal pipe disposed in each of the open ends, respectively, each metal pipe being made of a metal having a melting point of T1, wherein a top end is fused in a corresponding one of the open ends in a first of the open ends of the light-transmissive ceramic discharge vessel, and a second end of the open ends protrudes from the light-transmissive ceramic discharge vessel;
   a fusing metal made of a metal having a melting point of T2 and configured to seal a base end of each metal pipe;
   a plurality of electrodes, whose base ends are coupled to each metal pipe via the fusing metal, and whose top end protrudes into the light-transmissive ceramic discharge vessel; and
   a discharge agent filled in the light-transmissive ceramic discharge vessel,
   wherein the melting point T1 of each metal pipe and the melting point T2 of the fusing metal satisfy an equation:

$T1 > T2$.

5. The high pressure discharge lamp as claimed in claim 4, wherein a length of the electrodes is L3, and a length of the fusing metal in a bulb axis direction is L4, wherein $L3 > L4$.

6. The high pressure discharge lamp as claimed in claim 1, wherein
   the light-transmissive ceramic discharge vessel is provided with a thin cylindrical portion with outer diameter D2 formed at an end of the vessel,
   wherein each metal pipe has an outside diameter D3 which is inserted in the thin cylindrical portion of the light-transmissive ceramic discharge vessel for closing the end of the vessel, and
   wherein a ratio of the outer diameter D2 of the thin cylindrical portion and the outer diameter D3 of the metal pipe satisfies an equation:

$1.5 \leq D2/D3 \leq 4.0$.

7. The high pressure discharge lamp as claimed in claim 1, wherein the electrodes have an overall length L3 equal to or longer than 4 mm, wherein the electrodes comprise an electrode base-rod having a diameter D4 of less than 0.3 mm, and an electrode principal portion which is placed at an end of the electrode base-rod.

8. The high pressure discharge lamp as claimed in claim 1, wherein a length L2 of each metal pipe is exposed outside the light-transmissive ceramic discharge vessel and satisfies an equation:

$1.0 \leq L2 \leq 4.0$.

9. The high pressure discharge lamp as claimed in claim 1, wherein a linear transmittance of the vessel is at least 30% or more.

10. The high pressure discharge lamp as claimed in claim 1, wherein the plurality of electrodes is asymmetrical whereof one is a relatively thick rod, and the other one is a relatively thin rod.

11. The high pressure discharge lamp as claimed in claim 1, further comprising a feeder lead having a cross-sectional area more narrow than an overall cross-sectional area of the metal pipe and a lead-out from each metal pipe.

12. The high pressure discharge lamp as claimed in claim 1, further comprising a heat insulator which covers an outer surface of a portion of the metal pipe exposed outside the end portion of the light-transmissive ceramic discharge vessel.

13. A high pressure discharge lamp lighting device, comprising:
    the high pressure discharge lamp as defined in any one of claims 1 to 12; and
    a lighting circuit which biases high pressure discharge lamp, and which and which has a crest value of a starting voltage of 15 $kV_{p-p}$ or more.

14. A luminaire, comprising:
    a luminaire principal body;
    the high pressure discharge lamp as defined in any one of claims 1 to 12, wherein said high pressure discharge lamp is supported by the luminaire principal body; and
    a lighting circuit which biases the high pressure discharge lamp.

* * * * *